United States Patent
Hasuda et al.

(10) Patent No.: US 8,573,868 B2
(45) Date of Patent: Nov. 5, 2013

(54) CAMERA ACCESSORY, CAMERA ACCESSORY MOUNT, CAMERA BODY AND CAMERA BODY MOUNT

(75) Inventors: Masanori Hasuda, Fujisawa (JP); Hideaki Hoshikawa, Koshigaya (JP); Noriyasu Kotani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/331,620

(22) Filed: Dec. 20, 2011

(65) Prior Publication Data

US 2012/0195587 A1     Aug. 2, 2012

(30) Foreign Application Priority Data

Jan. 28, 2011   (JP) ................................. 2011-016805

(51) Int. Cl.
  *G03B 17/00* (2006.01)
  *G02B 7/02* (2006.01)
(52) U.S. Cl.
  USPC ............................ 396/531; 359/828; 396/532
(58) Field of Classification Search
  USPC ........................... 396/531–532; 359/819, 828
  See application file for complete search history.

(56) References Cited

U.S. PATENT DOCUMENTS

| | | | | |
|---|---|---|---|---|
| 4,239,364 | A * | 12/1980 | Doi | ................................. 396/531 |
| 4,307,954 | A * | 12/1981 | Ludwig | ........................... 396/531 |
| 4,659,203 | A | 4/1987 | Niwa et al. | |
| 4,994,829 | A * | 2/1991 | Tsukamoto | ....................... 396/27 |
| 5,995,760 | A | 11/1999 | Inoue et al. | |
| 6,089,761 | A * | 7/2000 | Sakurai | ........................... 396/531 |
| 7,599,617 | B2 * | 10/2009 | Tokiwa et al. | ................. 396/532 |

FOREIGN PATENT DOCUMENTS

| | | |
|---|---|---|
| JP | U-58-065029 | 5/1983 |
| JP | A-60-053943 | 3/1985 |
| JP | A-09-197528 | 7/1997 |
| JP | A-2000-089332 | 3/2000 |
| JP | A-2000-133397 | 5/2000 |
| JP | A-2004-102005 | 4/2004 |
| JP | A-2005-070712 | 3/2005 |
| JP | A-2008-015016 | 1/2008 |
| JP | A-2009-003362 | 1/2009 |

(Continued)

OTHER PUBLICATIONS

Jan. 29, 2013 Office Action issued in Japanese Patent Application No. 2011-016805 (with English translation).

(Continued)

*Primary Examiner* — Christopher Mahoney
(74) *Attorney, Agent, or Firm* — Oliff & Berridge, PLC

(57) ABSTRACT

A camera accessory is detachably engaged with a camera body including a camera body mount and body-side electric contact points. The camera accessory includes a camera accessory mount assuming a bayonet structure with a first tab, a second tab and a third tab. The camera accessory mount is configured to be inserted through the camera body mount without any of the first through third tabs hindered by three camera body-side tabs disposed at the camera body mount as long as the camera accessory mount is inserted at the camera body mount at a correct interlock phase. The camera accessory mount is configured such that insertion of the camera accessory mount through the camera body mount is disallowed at any phase other than the correct interlock phase with at least two tabs among the first through third tabs coming into contact with at least two of the camera body-side tabs.

24 Claims, 25 Drawing Sheets

(56) References Cited

FOREIGN PATENT DOCUMENTS

| | | |
|---|---|---|
| JP | A-2010-015894 | 1/2010 |
| JP | A-2010-054660 | 3/2010 |
| JP | A-2010-282101 | 12/2010 |

OTHER PUBLICATIONS

Jul. 2, 2013 Office Action issued in Japanese Patent Application No. 2011-016805 (with translation).

* cited by examiner

FRONT ⟵⟶ REAR

CAMERA ACCESSORY, CAMERA ACCESSORY MOUNT, CAMERA BODY AND CAMERA BODY MOUNT

INCORPORATION BY REFERENCE

The disclosure of the following priority application is herein incorporated by reference: Japanese Patent Application No. 2011-016805 filed Jan. 28, 2011

BACKGROUND OF THE INVENTION

1. Field of the Invention

The present invention relates to a camera accessory mount and a camera body mount adopting a bayonet structure, via which a camera accessory and a camera body can be detachably engaged with each other, and a camera accessory and a camera body with the mounts installed thereat.

2. Description of Related Art

A camera accessory, such as an exchangeable lens, and a camera body assuming structures that allow them to be detachably engaged with each other via a mount system adopting a bayonet structure are known in the related art. Such camera accessory and camera body are allowed to engage with each other only if the camera accessory mount is inserted through the camera body mount at the correct interlock phase. In the camera system disclosed in Japanese Laid Open Patent Publication No. 2005-70712, for instance, at least one of the three tabs at the camera accessory mount will contact one of the three tabs at the camera body mount and thus, the camera accessory and the camera body will not be able to engage with each other even if the user attempts to insert the camera accessory mount through the camera body mount at any phase other than the correct interlock phase.

SUMMARY OF THE INVENTION

When only one of the tabs at the mount of the camera accessory, i.e., a photographic lens, comes into contact with a tab at the camera body mount at a single contact point in the mount system for a camera body and a camera accessory described in Japanese Laid Open Patent Publication No, 2005-70712, the other two tabs on the photographic lens side may be positioned between the tabs on the camera body side. If the user then attempts to turn the photographic lens into the camera body in order to engage the photographic lens with the camera body in this state, the photographic lens may be allowed to rotate relative to the camera body. As a result, the photographic lens may be cross-threaded in the camera body mount and become engaged on an angle with respect to the camera body.

A camera accessory, according to a first aspect of the present invention, that is detachably engaged with a camera body including a camera body mount and a plurality of body-side electric contact points, the camera accessory comprises: a camera accessory mount assuming a bayonet structure with a first tab, a second tab and a third tab set over intervals in a circumferential direction running along a circumference of a circle with a predetermined diameter and projecting from the circumference along a radial direction; and accessory-side electric contact points made up with a plurality of electric contact points that become electrically connected with the body-side electric contact points as the camera accessory is mounted at the camera body, wherein: the camera accessory mount is configured to be inserted through the camera body mount without any of the first through third tabs hindered by three camera body-side tabs disposed at the camera body mount as long as the camera accessory mount is inserted at the camera body mount at a correct interlock phase, and the camera accessory mount is configured such that insertion of the camera accessory mount through the camera body mount is disallowed at any phase other than the correct interlock phase with at least two tabs among the first through third tabs coming into contact with at least two of the camera body-side tabs; as the camera accessory is mounted at the camera body, the first through third tabs each come into contact with an elastic member disposed at the camera body so that a force imparted from the elastic member is applied to the first through third tabs toward a rear side of the camera body; the first through third tabs each include a force application portion at which the force imparted from the elastic member is applied when the camera accessory is mounted at the camera body; and two force application portions located at positions close to a position where the accessory-side electric contact points are disposed, among a first force application portion of the first tab, a second force application portion of the second tab and a third force application portion of the third tab, are set so as to substantially achieve symmetry relative to the accessory-side electric contact points.

According to a second aspect of the present invention, in the camera accessory according to the first aspect, it is preferable that the first tab at the camera accessory mount having been inserted at the correct interlock phase and engaged with the camera body mount overlaps a camera body-side tab assuming an uppermost position when the camera body is set with a longitudinal orientation achieved by rotating the camera body assuming an upright, lateral orientation by approximately 90°.

According to a third aspect of the present invention, in the camera accessory according to the first aspect, the first tab, the second tab and the third tab may be fixed to a main body of the camera accessory.

According to a fourth aspect of the present invention, in the camera accessory according to the first aspect, the first tab, the second tab and the third tab may be disposed at a main body of the camera accessory so as to be rotatable along the circumferential direction relative to the main body of the camera accessory.

According to a fifth aspect of the present invention, in the camera accessory according to the first aspect, it is preferable that the first tab, the second tab and the third tab are made up with a tab present over an angular range of 56.5° to 115°, a tab present over an angular range of 172.5° to 214.5° and a tab present over an angular range of 272° to 343.5° at the camera accessory mount engaged with the camera body mount, along a clockwise direction relative to a nine o'clock direction viewed from a rear side of the camera accessory.

According to a sixth aspect of the present invention, in the camera accessory according to the first aspect, angles defining circular arcs representing lengths of the first tab, the second tab and the third tab extending along the circumferential direction may be respectively 71.5°, 58.5° and 42°.

According to a seventh aspect of the present invention, in the camera accessory according to the fifth aspect, it is preferable that when the first tab, the second tab and the third tab are rotated along the circumferential direction by 40.5° while the camera accessory mount is inserted at the correct interlock phase into the camera body mount, the camera accessory mount becomes engaged with the camera body mount.

A camera accessory mount, according to an eighth aspect of the present invention, included in the camera accessory according to the first aspect.

A camera body, according to a ninth aspect of the present invention, that is detachably engaged with a camera accessory including a camera accessory mount and a plurality of accessory-side electric contact points, the camera body comprises: a camera body mount with a first tab, a second tab and a third tab set over intervals along a circumferential edge of a circular opening at the camera body and projecting out from the circumferential edge along a radius of the circular opening; camera body-side electric contact points made up with a plurality of electric contact points that become electrically connected with the accessory-side electric contact points as the camera accessory is mounted at the camera body; and an elastic member that applies a force to each of three accessory-side tabs, located at the camera accessory mount included in the camera accessory, toward a rear side of the camera body as the camera accessory is mounted at the camera body, wherein: the elastic member includes three force-applying portions that come into contact with the three accessory-side tabs to apply force thereto; two force-applying portions located at positions close to a position where the camera body-side electric contact points are disposed, among the three force-applying portions, are set so as to substantially achieve symmetry relative to the camera body-side contact points; and the camera body mount is configured such that the camera accessory mount is inserted into the camera body mount without any of the first through third tabs hindering any of the three accessory-side tabs at the camera accessory mount, as long as the camera accessory mount is inserted at a correct interlock phase, and the camera body mount is configured such that insertion of the camera accessory mount is disallowed at any phase other than the correct interlock phase as at least two tabs among the first through third tabs and at least two of the accessory-side tabs come into contact with each other.

According to a tenth aspect of the present invention, in the camera body according to the ninth aspect, it is preferable that the camera body-side electric contact points are disposed in a substantially left/right symmetrical formation over an area corresponding to a bottom half of the opening at the camera body set upright in a lateral orientation; and the two force-applying portions located at positions close to the position at which the camera body-side electric contact points are disposed, among the three force-applying portions, are set so as to substantially achieve left/right symmetry with the camera body set upright in the lateral orientation.

According to a 11th aspect of the present invention, in the camera body according to the tenth aspect, it is preferable that the two force-applying portions located close to the position where the camera body-side electric contact points are disposed, among the three force-applying portions, are disposed near the camera body-side electric contact points present near two ends of a circular arc among the camera body-side electric contact points.

According to a 12th aspect of the present invention, in the camera body according to the ninth aspect, it is preferable that the first tab assumes an uppermost position when the camera body is set upright in a lateral orientation; the first through third tabs each include a first side end located at a leading end along a rotating direction in which the accessory-side tabs are rotated along the circumferential edge of the circular opening in order to engage the camera accessory mount having been inserted at the correct interlock phase with the camera body mount, and a second side end located at leading end along a direction opposite from the rotating direction; and when the first tab and either the second tab or the third tab come into contact with two of the accessory-side tabs at a total of two contact locations, a contact area at the first tab includes an area near the first side end of the first tab.

According to a 13th aspect of the present invention, in the camera body according to the 12th aspect, it is preferable that the opening is formed at a front side of the camera body; and the first tab extends along a circumference of the opening with a part thereof passing through a point at a top center of the opening at the camera body assuming the lateral orientation.

According to a 14th aspect of the present invention, in the camera body according to the 13th aspect, it is preferable that the first tab, the second tab and the third tab include restricting portions that restrict movement of the accessory-side tabs by coming into contact with the accessory-side tabs when the accessory-side tabs move toward a front side of the camera body against the force applied by the elastic member.

According to a 15th aspect of the present invention, in the camera body according to the 14th aspect, it is preferable that a restricting portion included in the first tab assumes a position directly above a center of the opening along a vertical direction when the camera body is set in the lateral orientation.

According to a 16th aspect of the present invention, in the camera body according to the ninth aspect, it is preferable that the first tab, the second tab and the third tab extend over different lengths along a circumference of the opening; and of the intervals each present between two consecutive tabs among the first tab, the second tab and the third tab, an interval between two tabs, occupying positions on two sides of a point set at a bottom center of the opening when the camera body is set in the lateral orientation, is largest.

According to a 17th aspect of the present invention, in the camera body according to the ninth aspect, it is preferable that the first tab, the second tab and the third tab are made up with a tab present over an angular range of 76° to 130°, a tab present over an angular range of 177.5° to 226° and a tab present over an angular range of 304.5° to 15° or 375° along a counterclockwise direction relative to a three o'clock direction when the opening at the camera body assuming a lateral orientation is viewed from a front side.

According to a 18th aspect of the present invention, in the camera body according to the ninth aspect, angular ranges measured along the circumferential edge of the opening, which represent sizes of the first tab, the second tab and the third tab, may be respectively 54°, 48.5° and 70.5°.

According to a 19th aspect of the present invention, in the camera body according to the ninth aspect, it is preferable that angular ranges measured along the circumferential edge of the opening, each representing a size of an interval between tabs disposed next to each other among the first through third tabs, are 47.5° for the interval between the first tab and the second tab, 78.5° for the interval between the second tab and the third tab, and 61° for the interval between the third tab and the first tab.

According to a 20th aspect of the present invention, in the camera body according to the 17th aspect, it is preferable that when the accessory-side tabs are rotated along a circumference of the opening by 40.5° while the camera accessory mount is inserted at the correct interlock phase into the camera body mount, the camera accessory mount becomes engaged with the camera body mount.

A camera body mount, according to a 21st aspect of the present invention, included in the camera body according to the ninth aspect.

A camera system according to a 22nd aspect of the present invention, comprises: a camera body; and a camera accessory that is detachably engaged with the camera body, wherein: the camera body comprises: a camera body mount with a first camera body-side tab, a second camera body-side tab and a third camera body-side tab set over intervals along a circumferential edge of a circular opening at the camera body and projecting out from the circumferential edge along a radius of the circular opening; camera body-side electric contact points; and a elastic member; and the camera accessory comprises: a camera accessory mount assuming a bayonet structure with a first accessory-side tab, a second accessory-side tab and a third accessory-side tab set over intervals in a circumferential direction running along a circumference of a circle with a predetermined diameter and projecting from the circumference along a radial direction; and accessory-side electric contact points, and wherein in the camera body the camera body-side electric contract points are made up with a plurality of electric contact points that become electrically connected with the accessory-side electric contact points as the camera accessory is mounted at the camera body; the elastic member applies a force to each of the first to third accessory-side tabs toward a rear side of the camera body as the camera accessory is mounted at the camera body; the elastic member includes three force-applying portions that come into contact with the first to third accessory-side tabs to apply force thereto; two force-applying portions located at positions close to a position where the camera body-side electric contact points are disposed, among the three force-applying portions, are set so as to substantially achieve symmetry relative to the camera body-side contact points; the camera body mount is configured such that the camera accessory mount is inserted into the camera body mount without any of the first through third camera body-side tabs hindering any of the first to third accessory-side tabs at the camera accessory mount, as long as the camera accessory mount is inserted at a correct interlock phase, and the camera body mount is configured such that insertion of the camera accessory mount is disallowed at any phase other than the correct interlock phase as at least two tabs among the first through third camera body-side tabs and at least two of the first to third accessory-side tabs come into contact with each other; and the first camera body-side tab, the second camera body-side tab and the third camera body-side tab are made up with a tab present over an angular range of 76° to 130°, a tab present over an angular range of 177.5° to 226° and a tab present over an angular range of 304.5° to 15° or 375° along a counter-clockwise direction relative to a three o'clock direction when the opening at the camera body assuming a lateral orientation is viewed from a front side, and wherein in the camera accessory, the accessory-side electric contact points are made up with a plurality of electric contact points that become electrically connected with the body-side electric contact points as the camera accessory is mounted at the camera body; as the camera accessory is mounted at the camera body, the first through third accessory-side tabs each come into contact with the elastic member so that a force imparted from the elastic member is applied to the first through third accessory-side tabs toward a rear side of the camera body; the first through third accessory-side tabs each include a force application portion at which the force imparted from the elastic member is applied when the camera accessory is mounted at the camera body; two force application portions located at positions close to a position where the accessory-side electric contact points are disposed, among a first force application portion of the first accessory-side tab, a second force application portion of the second accessory-side tab and a third force application portion of the third accessory-side tab, are set so as to substantially achieve symmetry relative to the accessory-side electric contact points; and the first accessory-side tab, the second accessory-side tab and the third accessory-side tab are made up with a tab present over an angular range of 56.5° to 115°, a tab present over an angular range of 172.5° to 214.5° and a tab present over an angular range of 272° to 343.5° at the camera accessory mount engaged with the camera body mount, along a clockwise direction relative to a nine o'clock direction viewed from a rear side of the camera accessory.

DESCRIPTION OF PREFERRED EMBODIMENT

Figure 1:
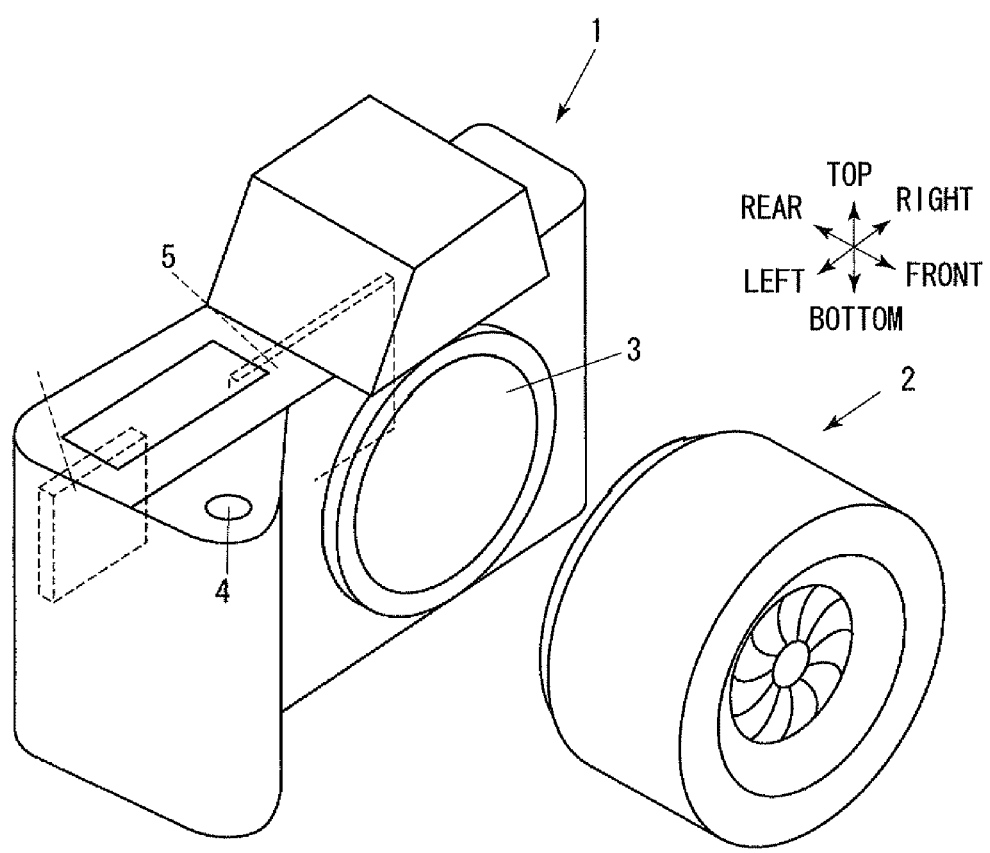
FIG. 1 is a perspective schematically illustrating a camera body and a photographic lens that can be detachably mounted at the camera body, in which the present invention may be adopted.

In reference to FIGS. 1 through 22, a camera accessory, a camera accessory mount, a camera body and a camera body mount achieved in an embodiment of the present invention are described. FIG. 1 is a schematic perspective of a camera body 1 compatible with a photographic lens (or exchangeable lens) 2 that may be detachably mounted at the camera body 1, in conjunction with which the present invention is adopted. A shutter release button 4, an image sensor 5 and a control circuit 6 that controls various units of the camera body 1 are disposed at the camera body 1. Reference numeral 3 indicates a photographic optical path through which a subject image departing the photographic lens 2 is guided to the image sensor 5. Reference numeral 9 indicates a lens retainer lock pin used to firmly lock the photographic lens 2 once it is fully mounted at the camera body 1 so as to disallow rotation of the photographic lens relative to the camera body 1.

On the front side of the camera body 1, a camera body mount 100 assuming a bayonet structure, via which a camera accessory, e.g., the photographic lens 2 or a converter lens used to adjust the focal length, is mounted, is disposed. On the rear side of the photographic lens 2, a camera accessory mount 200, via which the photographic lens 2 can be detachably mounted at the camera body mount 100, is disposed. It is to be noted that while FIG. 1 does not include detailed illustrations of the structures adopted in the camera body mount 100 and the camera accessory mount 200, a body-side electric contact point, to be detailed later, is located at the camera body 1 further inside relative to the opening of the camera body mount 100 and an accessory-side electric contact point, to be detailed later is located on the rear side of the photographic lens 2. In addition, in the description of the embodiment, the front side (toward the subject) of the camera body 1 on which the photographic lens 2 is mounted is referred to as "forward" and the rear side of the camera body 1 where the image sensor 5 is mounted is referred to as "rearward". A top-bottom direction and a left-right direction are defined as indicated in FIG. 1 for the camera body 1. FIG. 1 shows that the top-bottom direction relative to the camera body 1 matches the vertical direction. The attitude of the camera 1 shown in FIG. 1 is referred to as an upright attitude or a lateral orientation. The attitude of the camera body 1 assumed by rotating the camera body with the lateral orientation by 90° clockwise or counterclockwise viewed from the front side is referred to as a longitudinal orientation.

—Camera Body Mount 100—

Figure 2A:
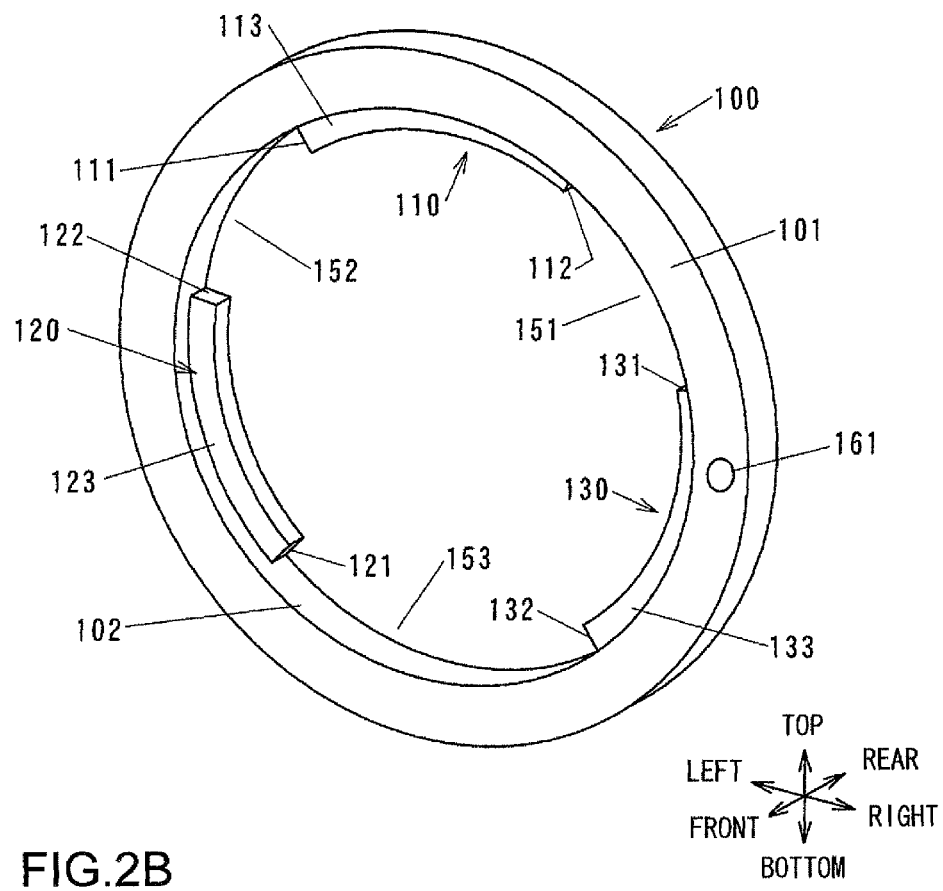
FIG. 2A is a perspective of a camera body mount viewed along a diagonal direction from a front right viewpoint relative to the camera body, and 2B is a section illustrating the structure of the camera body mount.
Figure 2B:
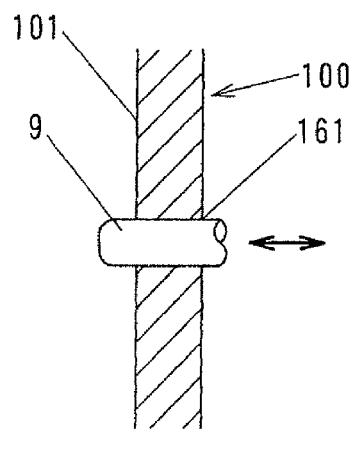

FIG. 2A is a perspective illustrating the structure of the camera body mount 100 viewed along a diagonal direction from a front right viewpoint relative to the camera body 1, and FIG. 2B shows the camera body mount 100 in a sectional view taken over an area near the lens retainer lock pin 9. The camera body mount 100 adopts a bayonet structure that includes three tabs (body-side tabs), set apart from one another along the circumferential edge of a circular opening (photographic optical path) at the camera body 1, each projecting inward from the outer side of the opening circumference. Among the three body-side tabs, the body-side tab located at the uppermost position is referred to as a body-side first tab 110, the body-side tab located next to the body-side first tab 110 along the counterclockwise direction in the figure is referred to as a body-side second tab 120 and the body-side tab located next to the body-side second tab 120 along the counterclockwise direction is referred to as a body-side third tab 130.

The space created between two consecutive body-side tabs, through which a tab (accessory-side tab) at the camera accessory mount 200 passes when the photographic lens 2 is being mounted or dismounted as explained later, is referred to as a body-side gap. The body-side gap present between the body-side third tab 130 and the body-side first tab 110 is referred to as a body-side first gap 151, the body-side gap located next to the body-side first gap 151 along the counterclockwise direction in the figure is referred to as a body-side second gap 152 and the body-side gap located next to the body-side second gap 152 along the counterclockwise direction is referred to as a body-side third gap 153.

The surface of the body-side first tab 110 facing forward is referred to as a front surface 113, the counterclockwise side end of the body-side first tab 110 facing the body-side second gap 152 is referred to as a first side end 111, and the clockwise side end of the body-side first tab 110 facing the body-side first gap 151 is referred to as a second side end 112. Likewise, the surface of the body-side second tab 120 facing forward is referred to as a front surface 123, the side end of the body-side second tab 120 facing the body-side third gap 153 is referred to as a first side end 121 and the side end of the body-side second tab 120 facing the body-side second gap 152 is referred to as a second side end 122. The surface of the body-side third tab 130 facing forward is referred to as a front surface 133, the side end of the body-side third tab 130 facing the body-side first gap 151 is referred to as a first side end 131, and the side end of the body-side third tab 130 facing the body-side third gap 153 is referred to as a second side end 132. It is to be noted that the first side ends 111, 121 and 131 are tab ends formed so as to face toward a mounting direction, to be described in detail later, whereas the second side ends 112, 122 and 132 are tab ends formed so as to face a direction opposite the mounting direction (dismounting direction).

Figure 9:
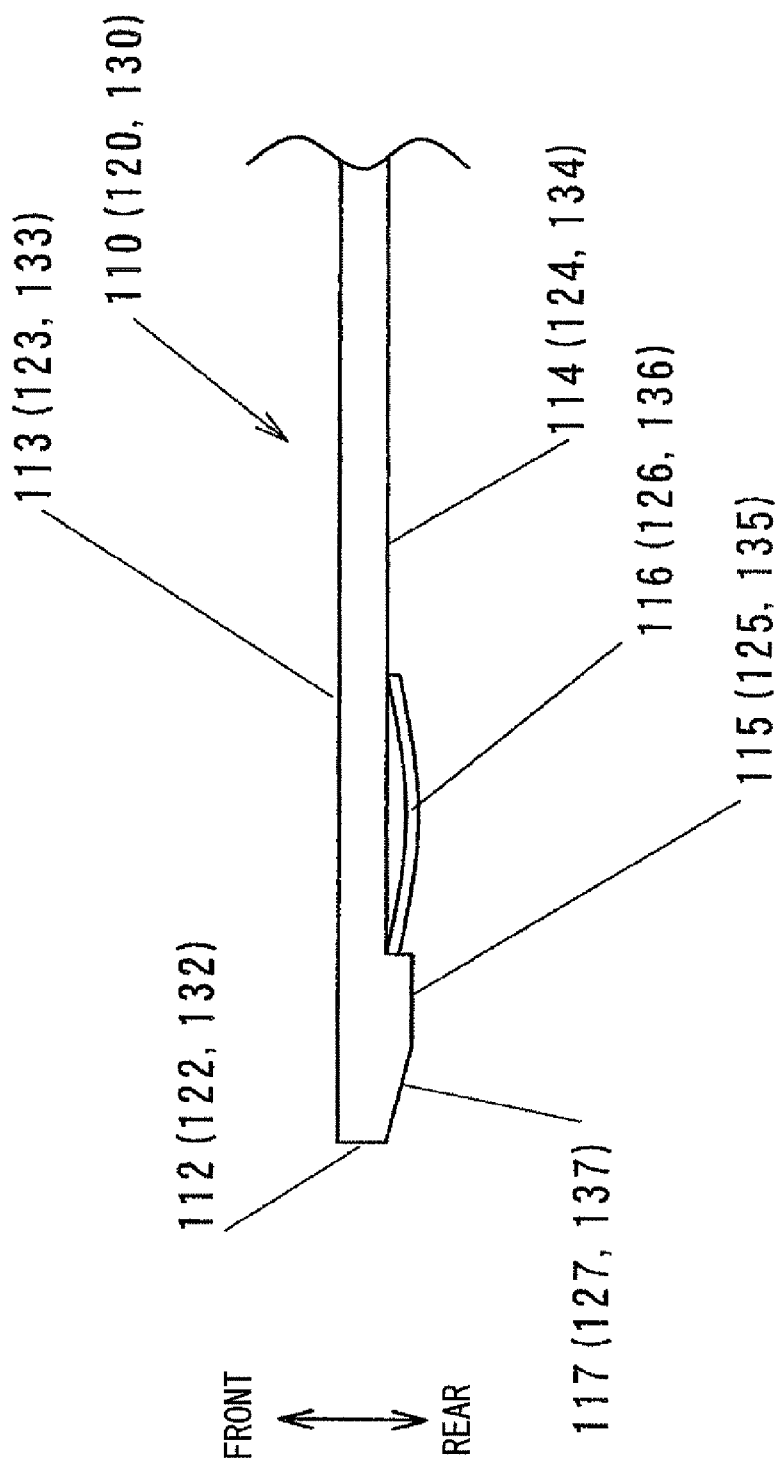
FIG. 9 schematically illustrates the body-side first tab along the circumference projected in a view taken from the outer side along the radial direction.

It is to be noted that, although not shown in FIG. 2A, the surface of the body-side first tab 110 facing rearward is referred to as a rear surface 114 (see FIG. 9). Likewise, the surfaces of the body-side second tab 120 and the body-side third tab 130 facing rearward are respectively referred as a rear surface 124 and a rear surface 134.

Reference numeral 101 indicates a camera body mount reference surface. The camera body mount reference surface 101 is a ring-shaped flat surface formed so as to face toward the front side. As the photographic lens 2 is mounted at the camera body 1, the camera body mount reference surface 101 comes into contact with a camera accessory mount reference surface 201 of the camera accessory mount 200, which is to be described in detail later, thereby regulating the position assumed by the photographic lens 2 along the front-rear direction. Reference numeral 102 indicates an inner circumferential surface of the cylindrical camera body mount 100. The inner circumferential surface 102, which interlocks with a fitting portion 202 of the camera accessory mount 200, to be detailed below, is used as a reference surface, in reference to which the optical axis of the photographic lens 2 is aligned with the optical axis of the camera body 1 (the central axis of the photographic optical path 3). Reference numeral 161 indicates a pin hole through which the lens retainer lock pin 9 projects out or retracts in. It is to be noted that a force imparted from a spring (not shown) causes the lens retainer lock pin 9 to project out beyond the camera body mount reference surface 101, as shown in FIG. 2B. As the user depresses a lens release button (not shown), the lens retainer lock pin 9 is retracted to the rear relative to the camera body mount reference surface 101 against the force imparted by the spring (not shown).

—Camera Accessory Mount 200—

Figure 3:
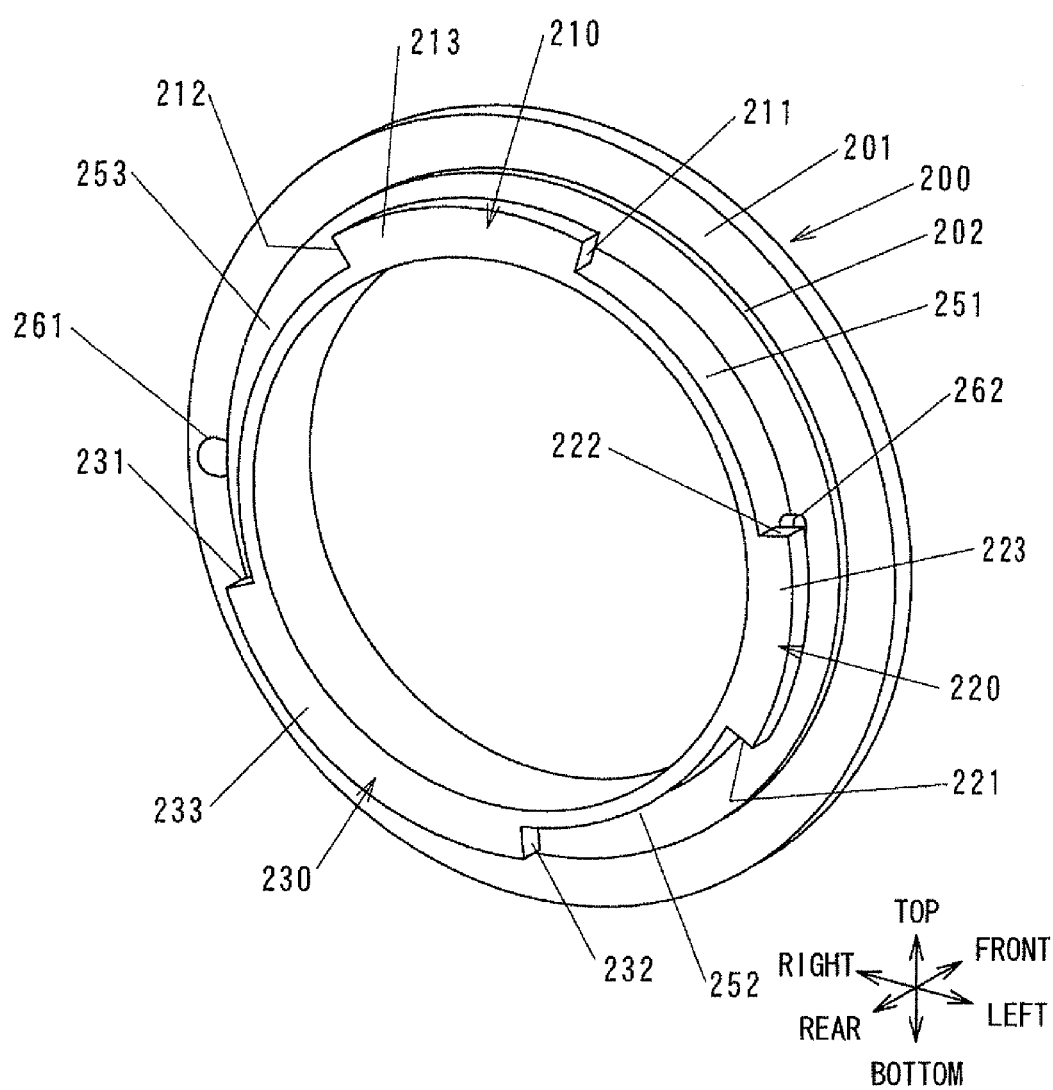
FIG. 3 is a perspective schematically illustrating the structure of a camera accessory mount, viewed along a diagonal direction from a rear left viewpoint relative to the photographic lens.

FIG. 3 is a perspective schematically illustrating the structure of the camera accessory mount 200 viewed along a diagonal direction from a rear left viewpoint relative to the photographic lens 2. It is to be noted that FIG. 3 shows the camera accessory mount 200 with the photographic lens 2 fully mounted at the camera body 1 (mounting complete state), i.e., in a photographing-enabled state. This means that the top-bottom/left-right orientation of the camera accessory mount 200 shown in FIG. 3 matches the top-bottom/left-right orientation of the camera body 1. Unless specifically noted, the following description is given by assuming that the top-bottom/left-right orientation of the camera accessory mount 200 is the orientation in the mounting complete state.

The camera accessory mount 200 adopts a bayonet structure that includes three tabs (accessory-side tabs) set apart from one another along the circumferential direction, each projecting from the inner side of the circumference toward the outer side of the circumference. Among the three accessory-side tabs, the accessory-side tab located at the uppermost position is referred to as an accessory-side first tab 210, the accessory-side tab located next to the accessory-side first tab 210 along the clockwise direction in the figure is referred to as an accessory-side second tab 220 and the accessory-side tab located next to the accessory-side second tab 220 along the clockwise direction is referred to as an accessory-side third tab 230.

The space created between two consecutive accessory-side tabs, through which a body-side tab passes when the photographic lens 2 is being mounted or dismounted as explained later, is referred to as an accessory-side gap. The accessory-side gap present between the accessory-side first tab 210 and the accessory-side second tab 220 is referred to as an accessory-side first gap 251, the accessory-side gap located next to the accessory-side first gap 251 along the clockwise direction in the figure is referred to as an accessory-side second gap 252 and the accessory-side gap located next to the accessory-side second gap 252 along the clockwise direction is referred to as an accessory-side third gap 253.

The surface of the accessory-side first tab 210 facing rearward is referred to as a rear surface 213, the side end of the accessory-side first tab 210 facing the accessory-side first gap 251 is referred to as a first side end 211 and the side end of the accessory-side first tab 210 facing the accessory-side third gap 253 is referred to as a second side end 212. Likewise, the surface of the accessory-side second tab 220 facing rearward is referred to as a rear surface 223, the side end of the accessory-side second tab 220 facing the accessory-side second gap 252 is referred to as a first side end 221, and the side end of the accessory-side second tab 220 facing the accessory-side first gap 251 is referred to as a second side end 222. The surface of the accessory-side third tab 230 facing rearward is referred to as a rear surface 233, the side end of the accessory-side third tab 230 facing the accessory-side third gap 253 is referred to as a first side end 231 and the side end of the accessory-side third tab 230 facing the accessory-side second gap 252 is referred to as a second side end 232. It is to be noted that the first side ends 211, 221 and 231 are tab ends formed so as to face toward the mounting direction to be described in detail later, whereas the second side ends 212, 222 and 232 are tab ends facing toward the direction (dismounting direction) opposite the mounting direction.

It is to be noted that, although not shown in FIG. 3, the surface of the accessory-side first tab 210 facing forward is referred to as a front surface 214. Likewise, the surfaces of the accessory-side second tab 220 and the accessory-side third tab 230 facing forward are respectively referred to as a front surface 224 and a front surface 234 (see FIG. 4B).

Reference numeral 201 indicates a camera accessory mount reference surface. The camera accessory mount reference surface 201 is a ring-shaped flat surface formed so as to face rearward, and is in contact with the camera body mount reference surface 101 when the photographic lens 2 is fully mounted. Reference numeral 202 indicates the fitting portion. The fitting portion 202 is a cylindrical portion that fits at the inner circumferential surface 102 of the camera body mount 100 and is used for reference when aligning the optical axis of the photographic lens 2 with the optical axis of the camera body 1 (the central axis of the photographic optical path 3). Reference numeral 261 indicates a pin hole. As the lens retainer lock pin 9 (not shown), which projects out from or retracts into the pin hole 161 at the camera body mount 100, is inserted through the pin hole 261, rotation of the fully mounted photographic lens 2 relative to the camera body 1 (camera body mount 100) becomes disallowed and the photographic lens 2 thus becomes locked.

Figure 4A:
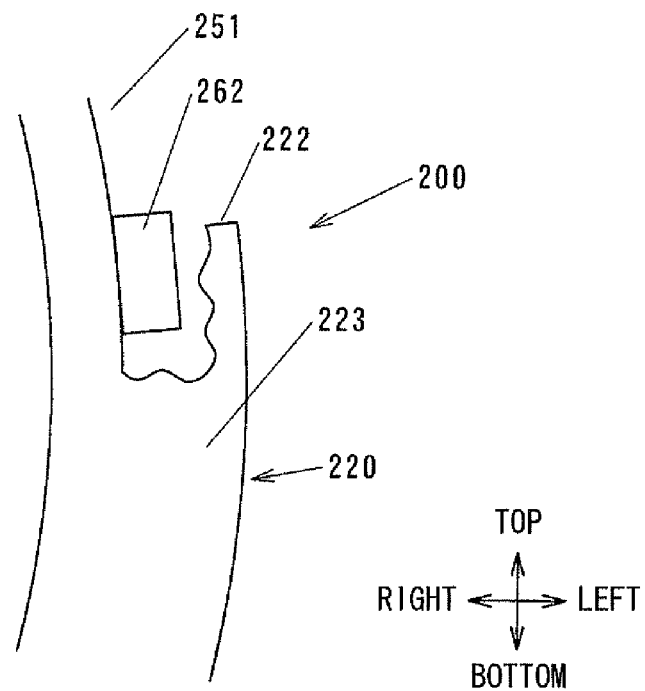
FIGS. 4A and 4B indicate the position at which a restricting member is disposed.
Figure 4B:
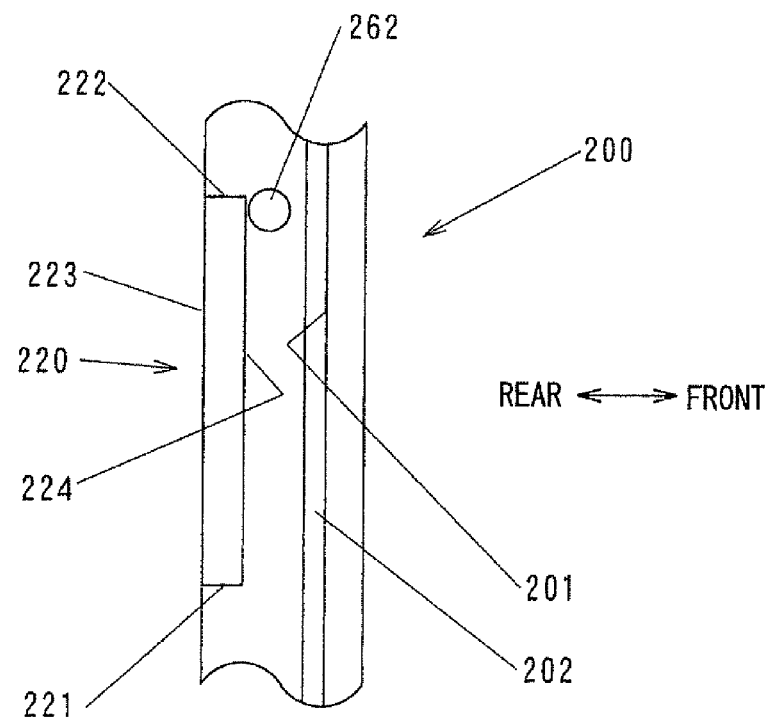

As shown in FIG. 3 and FIGS. 4A and 4B, a restricting member 262, which limits the rotation range of the photographic lens 2 (camera accessory mount 200) relative to the camera body 1 (camera body mount 100) while the photographic lens 2 is mounted or dismounted, is disposed frontward relative to the accessory-side second tab 220 near its second side end 222. The restriction of the rotation range achieved via the restricting member 262 will be described in detail later. The restricting member 262 may be, for instance, a headed pin screwed in from the outer side of the camera accessory mount 200 along the radial direction. It is to be noted that FIG. 4A shows the accessory-side second tab 220 near the second side end 222 in a rear view, whereas FIG. 4B shows the accessory-side second tab 220 near the second side end 222 viewed from the left side.

—Positions of Body-Side Tabs and Body-Side Gaps—

Figure 5:
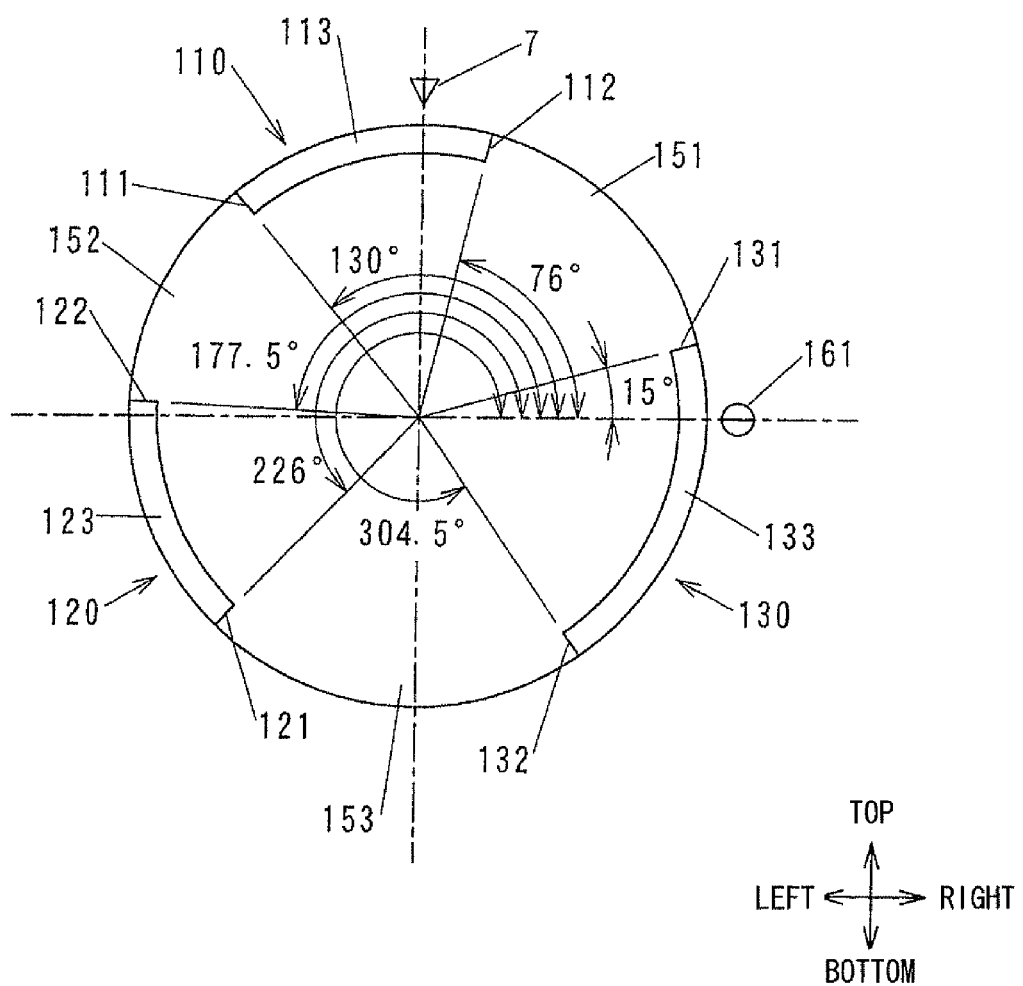
FIG. 5 indicates the positions of the body-side tabs and the body-side gaps at the camera body mount viewed from the front side of the camera body.

FIG. 5 indicates the positions of the body-side tabs and the body-side gaps at the camera body mount 100 viewed from the front side of the camera body 1. A reference angular position is taken along the three o'clock direction at the camera body mount 100 viewed from the front side of the camera body 1 and various angles representing the positions at which the body-side tabs are disposed, are assumed along the counterclockwise direction relative to the three o'clock direction. Namely, the body-side first tab 110 is present over an angular range of 76° to 130°, the body-side second tab 120 is present over an angular range of 177.5° to 226° and the body-side third tab 130 is present over an angular range of 304.5° to 15° (375°).

The sizes of the individual body-side tabs 110 to 130 can each be indicated by the corresponding angular range along the circumferential edge of the circular opening at the camera body mount 100. Namely, the body-side first tab 110 has a 54° angular range, the body-side second tab 120 has a 48.5° angular range and the body-side third tab 130 has a 70.5° angular range. Likewise, the sizes of the individual body-side gaps 151 to 153 can each be indicated by the corresponding angular range along the circumferential edge of the circular opening at the camera body 1. Namely, the body-side first gap 151 has a 61° angular range, the body-side second gap 152 has a 47.5° angular range and the body-side third gap 153 has a 78.5° angular range. This means that, the smallest gap at the camera body mount 100 is the body-side second gap 152 (47.5°).

Reference numeral 7 in FIG. 5 indicates an index mark at the camera body 1. The index mark 7 is used as a reference mark when mounting the photographic lens 2 at the camera body 1. The index mark 7 assumes a 90° angular position counterclockwise relative to the three o'clock reference direction taken at the camera body mount 100 viewed from the front side of the camera body 1.

—Positions of Accessory-Side Tabs and Accessory-Side Gaps—

Figure 6:
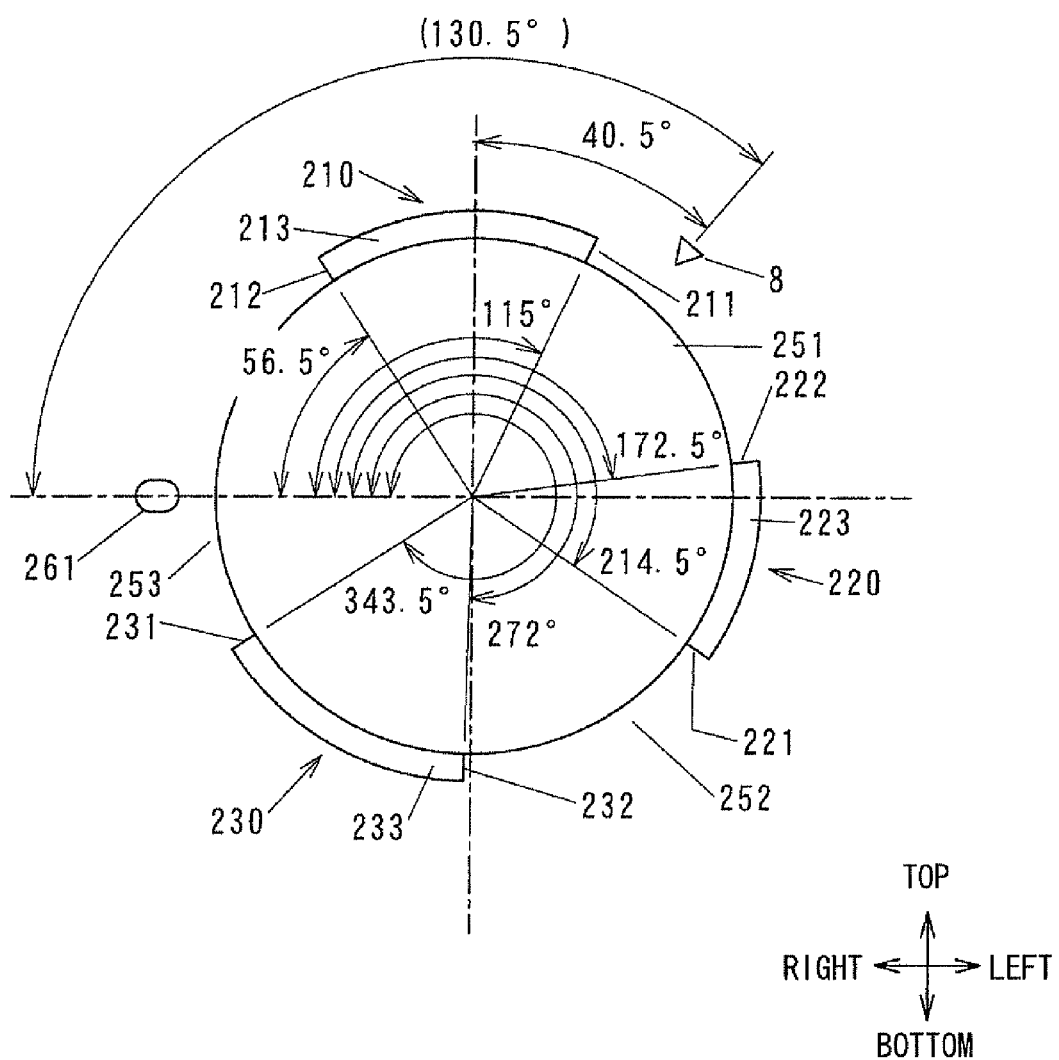
FIG. 6 indicates the positions of the accessory-side tabs and the accessory-side gaps at the camera accessory mount viewed from the rear side of the photographic lens.

FIG. 6 indicates the positions of the accessory-side tabs and the accessory-side gaps at the camera accessory mount 200 viewed from the rear side of the photographic lens 2. A reference angular position is taken along the nine o'clock direction at the camera accessory mount 200 viewed from the rear side of the photographic lens 2 fully mounted at the camera body. Various angles representing the positions at which the accessory-side tabs are disposed, are assumed along the clockwise direction relative to the nine o'clock direction. Namely, the accessory-side first tab 210 is present over an angular range of 56.5° to 115°, the accessory-side second tab 220 is present over an angular range of 172.5° to 214.5°, and the accessory-side third tab 230 is present over an angular range of 272° to 343.5°.

The ranges over which the accessory-side tabs 210 to 230 extend along the circumference of the camera accessory mount 200 can each be indicated by the corresponding angular range along the circumference of the camera accessory mount 200. Namely, the accessory-side first tab 210 has a 58.5° angular range, the accessory-side second tab 220 has a 42° angular range and the accessory-side third tab 230 has a 71.5° angular range. In other words, the angular ranges (the angles each indicating the range over which a specific tab is present) of the accessory-side first through third tabs represented by circular arcs extending along the circumferential direction, are; 58.5° for the accessory-side first tab 210, 42° for the accessory-side second tab 220 and 71.5° for accessory-side third tab 230. This means that the smallest tab among the accessory-side tabs is the accessory-side second tab 220 (42°).

Likewise, the sizes of the individual accessory-side gaps 251 to 253 can each be indicated by the corresponding angular range along the circumference of the camera accessory mount 200. Namely, the accessory-side first gap 251 has a 57.5° angular range, the accessory-side second gap 252 has a 57.5° angular range and the accessory-side third gap 253 has a 73° angular range.

Reference numeral 8 in FIG. 6 indicates an index mark at the photographic lens 2. The index mark 8 is used as a reference mark when mounting the photographic lens 2 at the camera body 1. The index mark 8 assumes a 130.5° angular position clockwise relative to the nine o'clock reference direction taken at the camera accessory mount 200 viewed from the rear side of the photographic lens 2 in the mounting complete state. This angle is equal to a value representing the sum of 90° and a mounting angle of 40.5° to be described in detail later.

As explained earlier, the restricting member 262 is disposed frontward relative to the accessory-side second tab 220 near its second side end 222. This means that the restricting member 262 is disposed near the accessory-side second tab 220 which extends over the shortest range along the circumference of the camera accessory mount 200 (with the smallest angular range along the circumference of the camera accessory mount 200).

—Mounting the Photographic Lens 2 at the Camera Body 1—

Figure 7:
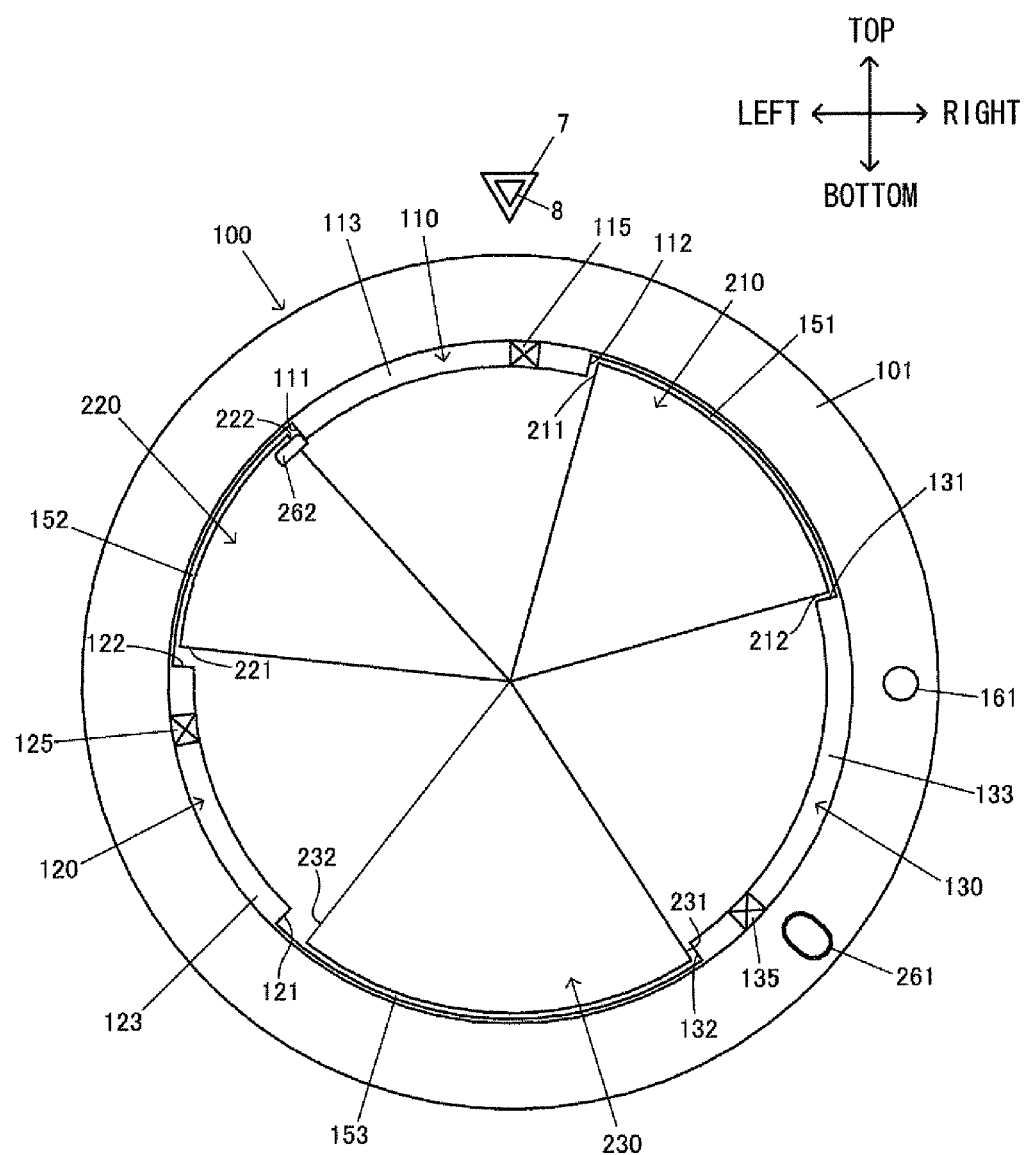
FIG. 7 shows a specific state of interference (state of overlap) between the body-side tabs and the accessory-side tabs.

The photographic lens 2 structured as described above is mounted at the camera body 1 through the following procedure. It is to be noted that the rotational position assumed by the photographic lens 2 relative to the camera body 1 when the axis extending along the front-rear direction through the center of the photographic optical path 3 of the camera body 1 and the optical axis of the photographic lens 2 are aligned with each other is to be hereafter referred to simply as an interlock phase. While sustaining the alignment of the axis extending along the front-rear direction through the center of the photographic optical path 3 at the camera body 1 and the optical axis of the photographic lens 2, the photographic lens 2 is mounted at the camera body 1 by aligning the rotational position of the index mark at the photographic lens 2 with the rotational position of the index mark at the camera body 1. When the two index marks are aligned, the photographic lens 2 and the camera body 1 achieve a positional relation relative to each other in which the body-side tabs 110 to 130 and the accessory-side tabs 210 to 230 do not interfere with each other, as shown in FIG. 7, and the camera accessory mount 200 can be thus inserted through the camera body mount 100 until the camera accessory mount reference surface 201 contacts the camera body mount reference surface 101. The interlock phase assumed in this state is to be referred to as a correct interlock phase. It is to be noted that in FIG. 7, showing a specific state of interference (state of overlap) between the body-side tabs 110 to 130 and the accessory-side tabs 210 to 230, the accessory-side tabs are shown as fan-shaped members in a schematic representation.

As the camera accessory mount 200 is inserted at the camera body mount 100 at the correct interlock phase, the accessory-side first tab 210 passes from front to back through the body-side first gap 151, the accessory-side second tab 220 passes from front to back through the body-side second gap 152 and the accessory-side third tab 230 passes from front to back through the body-side third gap 153. Likewise, the body-side first tab 110 passes from back to front through the accessory-side first gap 251 (no reference numeral appended in FIG. 7), the body-side second tab 120 passes from back to front through the accessory-side second gap 252 (no reference numeral appended in FIG. 7) and the body-side third tab 130 passes from back to front through the accessory-side third gap 253 (no reference numeral appended in FIG. 7), as the camera accessory mount 200 is inserted through the camera body mount 100 at the correct interlock phase.

Figure 8:
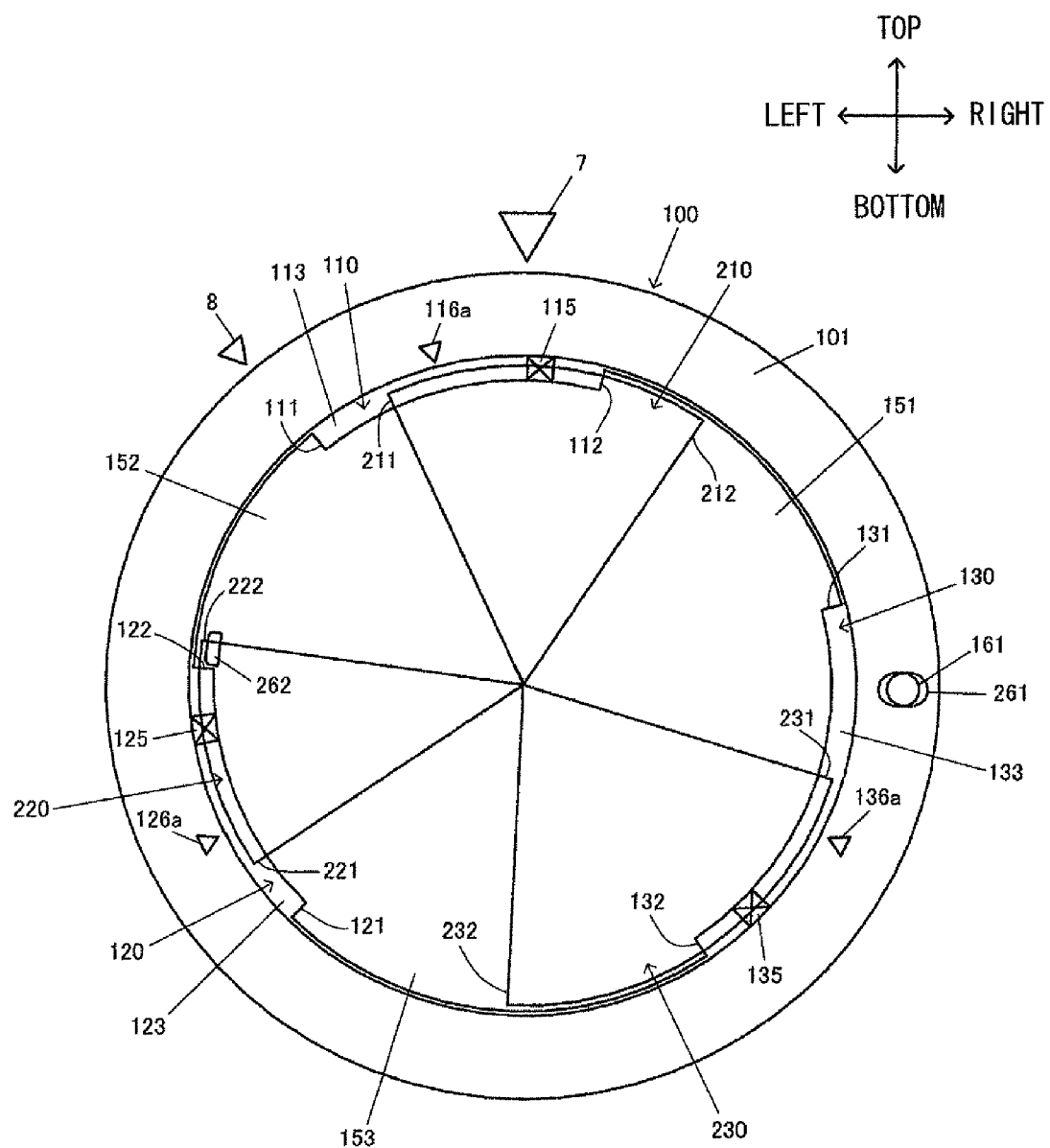
FIG. 8 shows a specific state of interference (state of overlap) between the body-side tabs and the accessory-side tabs.

As the photographic lens 2 is turned along the counterclockwise direction viewed from the front side of the camera body 1 after the camera accessory mount 200 is inserted through the camera body mount 100 at the correct interlock phase, the accessory-side first tab 210 takes up a position to the rear of the body-side first tab 110, the accessory-side second tab 220 takes up a position to the rear of the body-side second tab 120 and the accessory-side third tab 230 takes up a position to the rear of the body-side third tab 130. When the photographic lens 2 is turned by 40.5° relative to the correct interlock phase along the counterclockwise direction viewed from the front side of the camera body 1 as shown in FIG. 8, the lens retainer lock pin 9 projecting out from the pin hole 161 as the camera body mount 100 is inserted into the pin hole 261 at the camera accessory mount 200, thereby preventing further rotation along the counterclockwise direction. It is to be noted that if the photographic lens 2 is rotated along the counterclockwise direction with the lens retainer lock pin 9 retracted rearward relative to the camera body mount reference surface 101 by holding down the lens release button (not shown), the restricting member 262 comes into contact with the second side end 122 of the body-side second tab 120, thereby restricting any further rotation along the counterclockwise direction.

In other words, once the photographic lens 2 is turned by 40.5° along the counterclockwise direction from the correct interlock phase, the camera accessory mount 200 becomes engaged with the camera body mount 100 (engagement of the accessory-side tabs and the body-side tabs is completed) and thus, the photographic lens 2 becomes fully mounted. The rotational angle of 40.5°, by which the photographic lens 2 is turned from the correct interlock phase to the phase at which mounting of the photographic lens 2 is completed, is to be referred to as a mounting angle. In addition, the counterclockwise turning direction mentioned above may be otherwise referred to as a mounting direction.

When the photographic lens 2 is fully mounted, the position of the pin hole 261 at the camera accessory mount 200 is aligned with the position of the pin hole 161 at the camera body mount 100. The lens retainer lock pin 9 projecting out from the pin hole 161 at the camera body mount 100 is thus inserted through the pin hole 261.

—Dismounting the Photographic Lens 2 from the Camera Body 1—

The photographic lens 2 is dismounted from the camera body 1 through the following procedure. The lens release button (not shown) disposed at the camera body 1 is depressed so as to retract the lens retainer lock pin 9 from the pin hole 261. As the photographic lens 2 is turned back to the correct interlock phase along the clockwise direction viewed from the front side of the camera body 1 in this state, the accessory-side tabs and the body-side tabs become disengaged. When the photographic lens 2 is turned to the correct interlock phase, the restricting member 262 comes in contact with the first side end 111 of the body-side first tab 110, thereby preventing further rotation along the clockwise direction. In other words, the state shown in FIG. 7 is resumed. Since the body-side tabs 110 to 130 and the accessory-side tabs 210 to 230 do not interfere with each other at the correct interlock position, as explained earlier, the photographic lens 2 can be pulled forward and separated from the camera body 1. It is to be noted that the clockwise turning direction mentioned above may be otherwise referred to as a dismounting direction.

As explained above, the restricting member 262 comes into contact with the second side end 122 of the body-side second tab 120 so as to restrict the rotation of the photographic lens 2 along the mounting direction if the user attempts to mount the photographic lens 2 onto the camera body 1 while holding down the lens release button (not shown). In addition, when dismounting the photographic lens 2 from the camera body 1, the restricting member 262 comes into contact with the first side end 111 of the body-side first tab 110, thereby restricting rotation of the lens along the dismounting direction.

—State of Engagement Between Accessory-Side Tabs and Body-Side Tabs—

FIG. 9 is a schematic view of the body-side first tab 110 expanded along the circumference, taken from the outer side along the radial direction. The body-side first tab 110 includes a tapered surface 117 formed on the side where the rear surface 114 is located, near the second side end 112. The tapered surface 117 is formed so as to allow the accessory-side first tab 210 to smoothly move into a position to the rear of the body-side first tab 110 while the photographic lens 2 is being mounted. A contact portion 115, constituted with a surface ranging perpendicular to the direction extending from front to rear relative to the camera body mount 100, is formed continuous to the tapered surface 117 at the body-side first tab 110 near the second side end 112. Near the rear surface 114, a spring 116 is disposed at a position adjacent to the contact portion 115.

The spring 116 is an elastic member constituted with, for instance, a plate spring, which comes in contact with the front surface 214 (not shown in FIG. 9) of the accessory-side first tab 210 having moved into the position to the rear of the body-side first tab 110 and presses the front surface 214 rearward so as to hold the camera accessory mount reference surface 201 and the camera body mount reference surface 101 in contact with each other. If an external force that would cause the photographic lens 2 to tilt relative to the camera body 1 against the force applied by the spring 116 is applied to the photographic lens 2 having become fully mounted, the contact portion 115 comes in contact with the front surface 214 of the accessory-side first tab 210 to restrict any forward displacement of the accessory-side first tab 210. It is to be noted while the force applied by the spring 116 keeps the camera accessory mount reference surface 201 and the camera body mount reference surface 101 in contact (tight contact) with each other, the contact portion 115 is set slightly apart from the front surface 214 of the accessory-side first tab 210.

The body-side second tab 120 and the body-side third tab 130 adopt structures similar to that described above. Namely, the body-side second tab 120 includes a tapered surface 127 formed on the side where the rear surface 124 is located, near the second side end 122. A contact portion 125, constituted with a surface ranging perpendicular to the direction extending from front to rear relative to the camera body mount 100, is formed continuous to the tapered surface 127 at the body-side second tab 120 near the second side end 122. Near the rear surface 124, a spring 126 is disposed at a position adjacent to the contact portion 125. The body-side third tab 130 includes a tapered surface 137 formed on the side where the rear surface 134 is located, near the second side end 132. A contact portion 135, constituted with a surface ranging perpendicular to the direction extending from front to rear relative to the camera body mount 100, is formed continuous to the tapered surface 137 at the body-side third tab 130 near the second side end 132. Near the rear surface 134, a spring 136 is disposed at a position adjacent to the contact portion 135.

A mark assigned with reference numeral 116a in FIG. 8 indicates the position at which the spring 116 presses the front surface 214 of the accessory-side first tab 210, i.e., the specific phase of the spring force pressing position assumed along the circumferential direction. Likewise, a mark assigned with reference numeral 126a indicates the specific phase of the position at which the spring 126 presses the front surface 224 of the accessory-side second tab 220 assumed along the circumferential direction, and a mark assigned with reference numeral 136a indicates the specific phase of the position at which the spring 136 presses the front surface 234 of the accessory-side third tab 230 assumed along the circumferential direction. The phases indicated by the various reference numerals 116a, 126a and 136a will be described in detail later.

As indicated in FIGS. 7 and 8, the contact portion 115 is located substantially at the top center of the camera body mount 100. The contact portion 125 is disposed at a position set apart from the second side end 122 of the body-side second tab 120 by a distance equal to the distance setting the contact portion 115 apart from the second side end 112 at the body-side first tab 110. The contact portion 135 is disposed at a position set apart from the second side end 132 of the body-side third tab 130 by a distance equal to the distance setting the contact portion 115 apart from the second side end 112 at the body-side first tab 110.

Figure 10A:
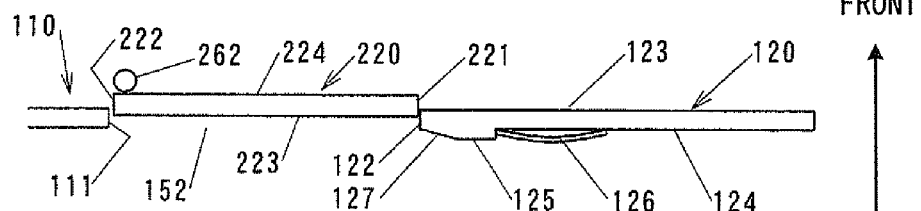
FIGS. 10A through 10F illustrate how the state of engagement between the accessory-side second tab and the body-side second tab changes as the photographic lens is mounted and dismounted.
Figure 10B:
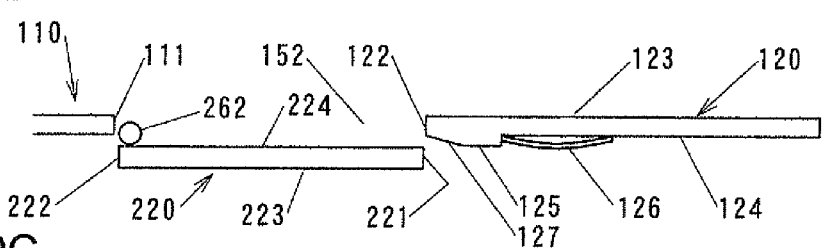

FIGS. 10A through 10F show changes in the state of engagement between the accessory-side second tab 220 and the body-side second tab 120 occurring in time series as the photographic lens 2 is mounted at the camera body 1 and then is dismounted from the camera body 1 in schematic views of the body-side second tab 120 expanded along the circumference, taken from the outer side along the radial direction. FIG. 10A shows the accessory-side second tab 220 of the camera accessory mount 200 having been inserted at the correct interlock phase, passing through the body-side second gap 152. FIG. 10B shows the state of the accessory-side second tab 220 and the body-side second tab 120 assumed after the accessory-side second tab 220 passes through the body-side second gap 152 and the camera accessory mount reference surface 201 comes into contact with the camera body mount reference surface 101.

Figure 10C:
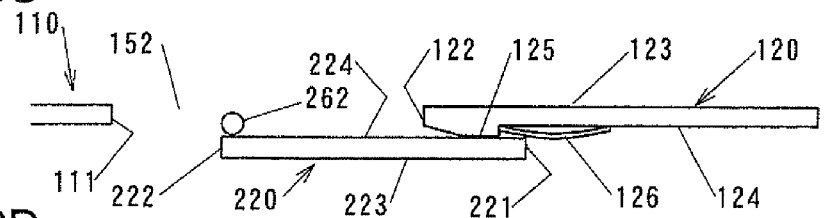
Figure 10D:
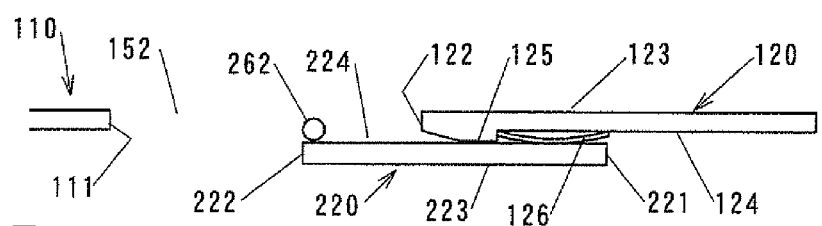

Subsequently, as the photographic lens 2 is turned along the mounting direction, the accessory-side second tab 220 moves into a position to the rear of the body-side second tab 120, as shown in FIG. 10C. The accessory-side second tab 220 further moves to the rear of the spring 126, resulting in an application of a rearward force by the spring 126 to the accessory-side second tab 220, as illustrated in FIG. 10D. Once the photographic lens 2 is turned from the correct interlock phase by an extent matching the mounting angle along the mounting direction, the restricting member 262 comes into contact with the second side end 122 of the body-side second tab 120, as shown in FIG. 10E, thereby preventing further rotation of the photographic lens 2 along the mounting direction.

Figure 10E:
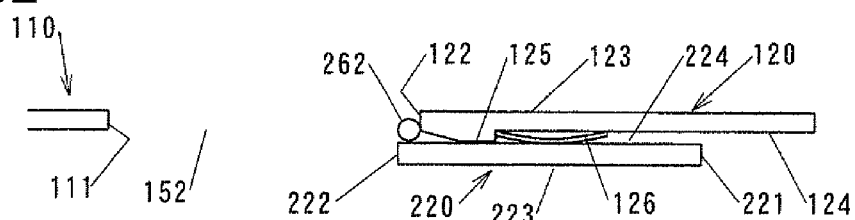
Figure 10F:
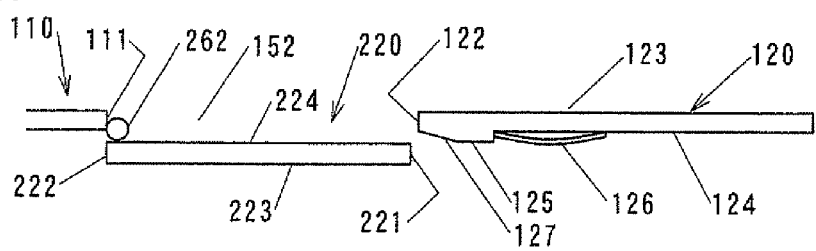

In the state shown in FIG. 10E, the photographic lens 2 is turned along the dismounting direction in order to dismount the photographic lens 2 from the camera body 1. Once the photographic lens 2 is turned along the dismounting direction by an extent matching the mounting angle, the restricting member 262 comes in contact with the first side end 111 of the body-side first tab 110, as illustrated in FIG. 10F, thereby preventing further rotation of the photographic lens 2 along the dismounting direction.

—Insertion of the Photographic Lens 2 at any Phase other than the Correct Interlock Phase—

If the user attempts to insert the photographic lens 2 at any phase other than the correct interlock phase, at least two tabs among the body-side tabs 110 to 130 and at least two tabs among the accessory-side tabs 210 to 230 come into contact with each other at, at least, two locations, and thus, insertion of the camera accessory mount 200 through the camera body mount 100 is disallowed (deterred) in the embodiment.

As can be surmised by viewing FIG. 7, if the user attempts to mount the photographic lens 2 slightly offset from the correct interlock phase along the counterclockwise direction in the figure, the rear surface 213 of the accessory-side first tab 210 will come into contact with the front surface 113 of the body-side first tab 110, the rear surface 223 of the accessory-side second tab 220 will come into contact with the front surface 123 of the body-side second tab 120, and the rear surface 233 of the accessory-side third tab 230 will come into contact with the front surface 133 of the body-side third tab 130. As a result, the three body-side tabs 110 to 130 and the three accessory-side tabs 210 to 230 will be in contact with each other and insertion of the camera accessory mount 200 into the camera body mount 100 will be disallowed. This situation may arise when, for instance, the accessory-side tabs 210 to 230 in FIG. 8 are positioned frontward relative to the body-side tabs 110 to 130.

Figure 11:
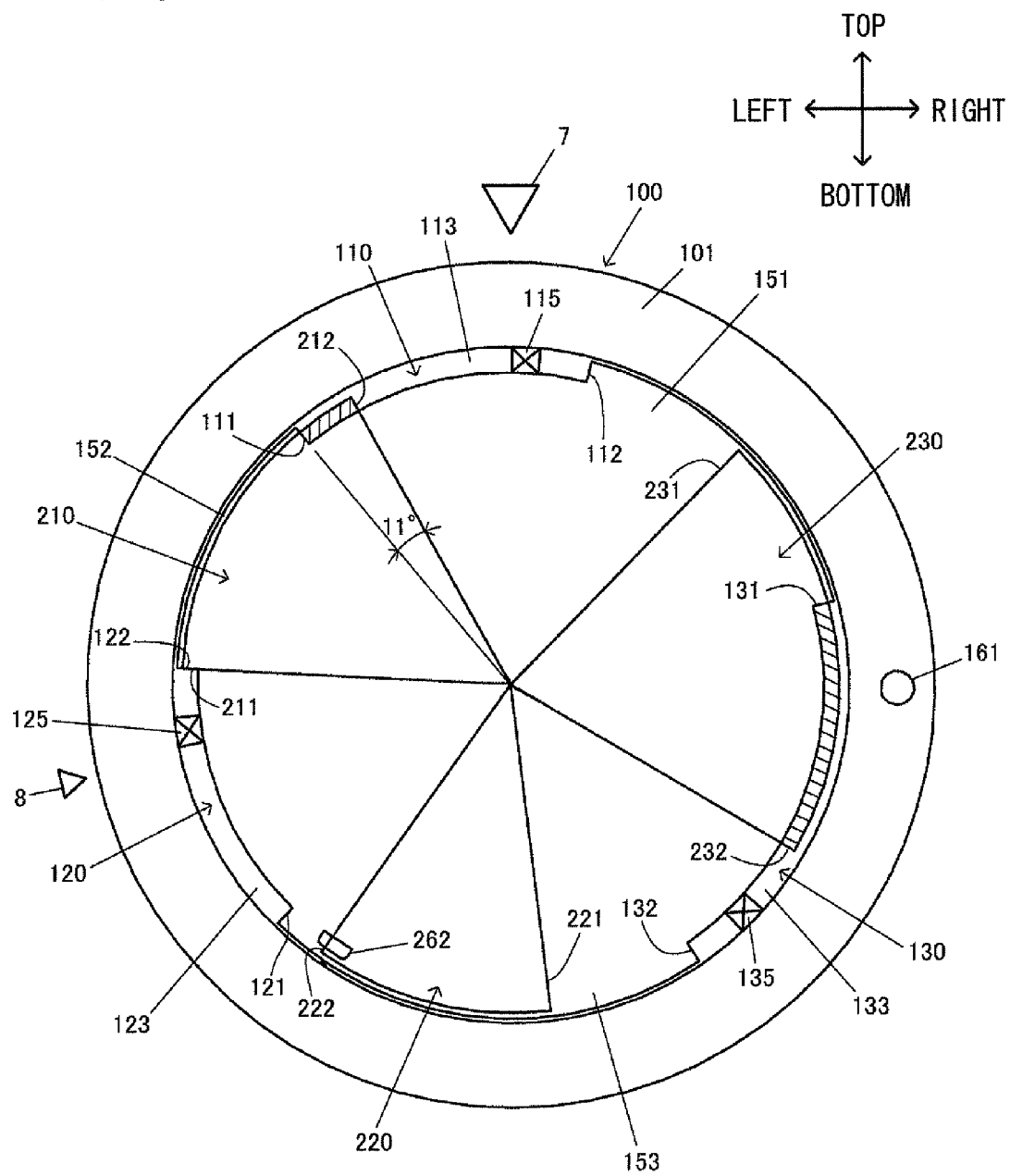
FIG. 11 shows a specific state of interference (state of overlap) between the body-side tabs and the accessory-side tabs.

If the user attempts to mount the photographic lens 2 turned by a greater extent along the counterclockwise direction relative to the state described above, the accessory-side second tab 220 will move frontward relative to the body-side third gap 153, as shown in FIG. 11 and thus, the accessory-side second tab 220 will no longer be in contact with any of the body-side tabs 110 to 130. However, the rear surface 213 of the accessory-side first tab 210 will be in contact with the front surface 113 of the body-side first tab 110 and the rear surface 233 of the accessory-side third tab 230 will be in contact with the front surface 133 of the body-side third tab 130. In this situation, the contact achieved by the two body-side tabs among the body-side tabs 110 to 130 and the two accessory-side tabs among the accessory-side tabs 210 to 230 disallows insertion of the camera accessory mount 200 through the camera body mount 100. The contact thus achieved by the body-side tabs 110 to 130 and the accessory-side tabs at a total of two contact locations is indicated as the hatched areas in FIG. 11.

A slight counterclockwise rotation of the photographic lens 2 will alter the positional relationship of the two mounts relative to each other in FIG. 11 to a positional relationship whereby the rear surface 213 of the accessory-side first tab 210 contacts the front surface 123 of the body-side second tab 120. Namely, a slight counterclockwise turn of the photographic lens 2 will allow the body-side tabs 110 to 130 and the accessory-side tabs 210 to 230 to achieve contact at three contact locations. If, on the other hand, the photographic lens 2 in the state shown in FIG. 11 is turned along the clockwise direction, the rear surface 213 of the accessory-side first tab 210 and the front surface 113 of the body-side first tab 110 will contact each other over a larger area and the rear surface 233 of the accessory-side third tab 230 and the front surface 133 of the body-side third tab 130 will contact each other over a larger area.

In other words, FIG. 11 shows a state in which the contact of the rear surface 213 of the accessory-side first tab 210 and the front surface 113 of the body-side first tab 110 and the contact of the rear surface 233 of the accessory-side third tab 230 and the front surface 133 of the body-side third tab 130 are achieved at the two contact locations over the smallest contact area. The rear surface 213 of the accessory-side first tab 210 and the front surface 113 of the body-side first tab 110 contact each other at the interlock phase shown in FIG. 11 over an angular range, assumed by viewing the camera body mount 100 from the front side of the camera body 1, of 11°.

It is to be noted that there are other situations in which insertion of the camera accessory mount 200 through the camera body mount 100 is disallowed via a total of two contact locations where two tabs among the body-side tabs 110 to 130 and two tabs among the accessory-side tabs 210 to 230 contact each other, as described in detail later. Among the plurality of states in which insertion of the camera accessory mount 200 through the camera body mount 100 is disallowed via a total of two contact locations where two tabs among the body-side tabs 110 to 130 and two tabs among the accessory-side tabs 210 to 230 achieve contact, the smallest contact area is formed at either of the two contact locations in two specific conditions, i.e., the state shown in FIG. 11 and the state (not shown) achieved by rotating the photographic lens 2 in the state shown in FIG. 11 by 11° along the counterclockwise direction in the figure, as described below.

If the photographic lens 2 with the two mounts assuming the specific positional relationship relative to each other as shown in FIG. 11 is turned by 11° along the counterclockwise direction in the figure, the contact of the rear surface 213 of the accessory-side first tab 210 and the front surface 113 of the body-side first tab 110 will cease but the rear surface 213 of the accessory-side first tab 210 will come into contact with the front surface 123 of the body-side second tab 120. It is to be noted that contact will also be achieved as the rear surface 233 of the accessory-side third tab 230 comes into contact with the front surface 133 of the body-side third tab 130. In this situation, the rear surface 213 of the accessory-side first tab 210 and the front surface 123 of the body-side second tab 120 will contact each other over an angular range, assumed by viewing the camera body mount 100 from the front side of the camera body 1, of 11°, as in the state shown in FIG. 11.

Thus, in this case too, contact will be achieved by the body-side tabs 110 to 130 and the accessory-side tabs 210 to 230 at a total of two contact locations. Among various states in which contact is achieved by the rear surface 213 of the accessory-side first tab 210 and the front surface 123 of the body-side second tab 120 and contact is achieved by the rear surface 233 of the accessory-side third tab 230 and the front surface 133 of the body-side third tab 130 at a total of two contact locations, the accessory-side tabs and the body-side tabs contact each other over the smallest area in this state.

Namely, while there are various insertion disallowed states, in which insertion of the camera accessory mount 200 through the camera body mount 100 is disallowed via a total of two contact locations where two tabs among the body-side tabs 110 to 130 and two tabs among the accessory-side tabs 210 to 230 contact each other, the rear surface 213 of the accessory-side first tab 210 and the front surface 113 of the body-side first tab 110 contact each other over the smallest contact area in the insertion-disallowed state shown in FIG. 11. Likewise, the smallest contact area is also formed by the rear surface 213 of the accessory-side first tab 210 and the front surface 123 of the body-side second tab 120 in the insertion disallowed state with the photographic lens 2 turned counterclockwise by 11° relative to the state shown in FIG. 11, among the insertion disallowed states in which insertion of the camera accessory mount 200 through the camera body mount 100 is disallowed via a total of two contact locations where two tabs among the body-side tabs 110 to 130 and two tabs among the accessory-side tabs 210 to 230 contact each other. The interlock phase shown in FIG. 11 and the interlock phase assumed with the photographic lens 2 turned by 11° along the counterclockwise direction relative to the state shown in FIG. 11 are each referred to as a specific interlock phase.

As described above, a counterclockwise rotation of the photographic lens 2 in the state shown in FIG. 11 will cause the rear surface 213 of the accessory-side first tab 210 to come into contact with both the front surface 113 of the body-side first tab 110 and the front surface 123 of the body-side second tab 120 and cause the rear surface 233 of the accessory-side third tab 230 to come into contact with the front surface 133 of the body-side third tab 130. In other words, the body-side tabs 110 to 130 and the accessory-side tabs 210 to 230 will achieve contact at a total of three contact locations.

As the photographic lens 2 is turned further counterclockwise in the figure until the photographic lens 2 is rotated by 11° along the counterclockwise direction relative to the state shown in FIG. 11, as described above, the rear surface 213 of the accessory-side first tab 210 and the front surface 113 of the body-side first tab 110 will cease to be in contact with each other and thus, the number of contact locations where the body-side tabs 110 to 130 and the accessory-side tabs 210 to 230 contact each other will be reduced to two.

Figure 12:
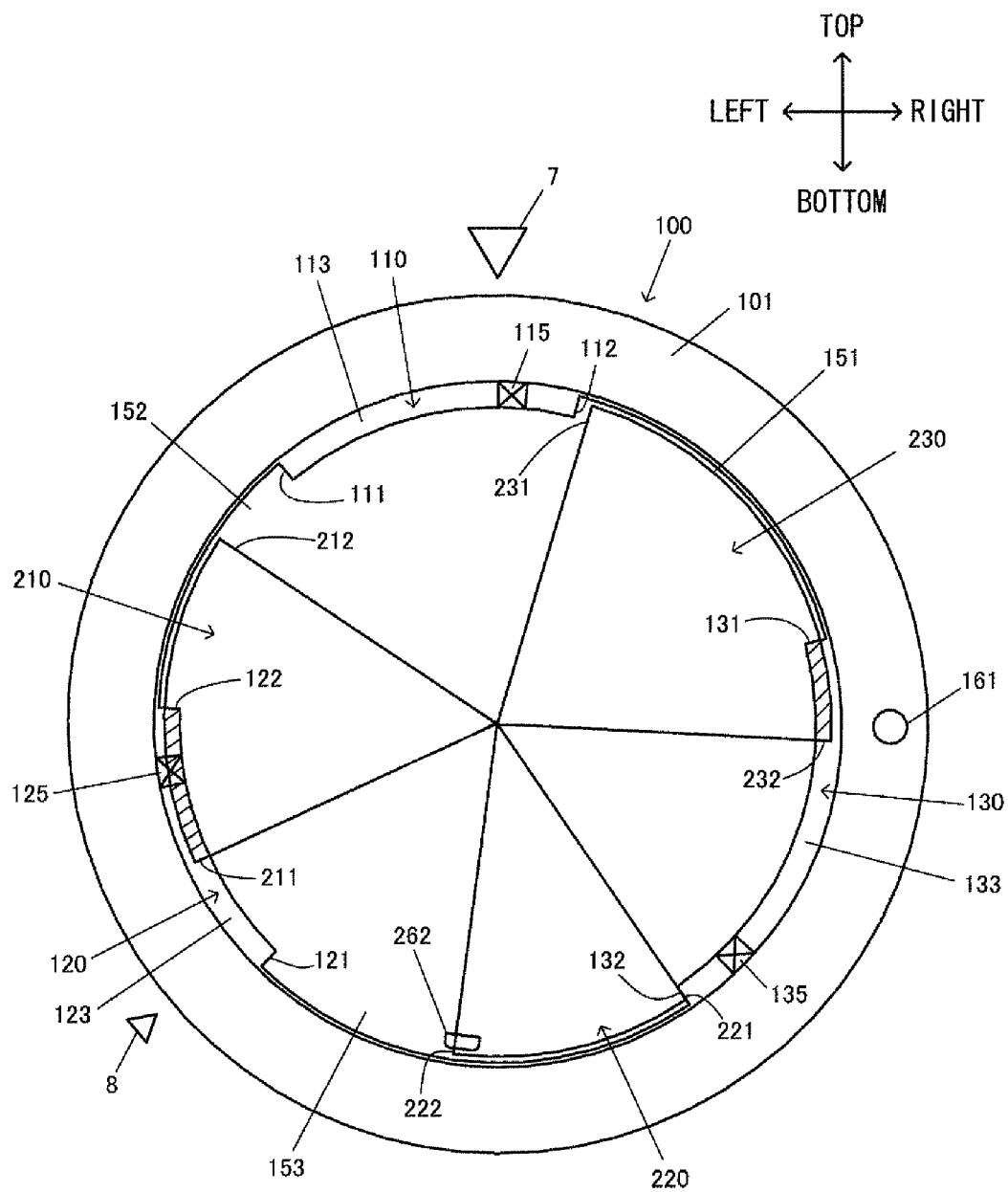
FIG. 12 shows a specific state of interference (state of overlap) between the body-side tabs and the accessory-side tabs.

As the photographic lens 2 is turned further along the counterclockwise direction in the figure, the state shown in FIG. 12 will be achieved.

As can be surmised by viewing FIG. 12, a slight counterclockwise turn of the photographic lens 2 will alter the positional relationship shown in FIG. 12, causing the rear surface 223 of the accessory-side second tab 220 to come into contact with the front surface 133 of the body-side third tab 130. In other words, contact will be achieved by the body-side tabs 110 to 130 and the accessory-side tabs 210 to 230 at a total of three contact locations. A further counterclockwise turn of the photographic lens 2 will cause the rear surface 233 of the accessory-side third tab 230 to come into contact with the front surface 113 of the body-side first tab 110 as well. In this situation, contact will be achieved by the body-side tabs 110 to 130 and the accessory-side tabs 210 to 230 at a total of four contact locations.

As the photographic lens 2 is turned further counterclockwise, the rear surface 233 of the accessory-side third tab 230 and the front surface 133 of the body-side third tab 130 will cease contact with each other and then, the rear surface 213 of the accessory-side first tab 210 and the front surface 123 of the body-side second tab 120, too, will cease contact with each other. In other words, contact will be achieved by the body-side tabs 110 to 130 and the accessory-side tabs 210 to 230 at a total of two contact locations under these circumstances, as shown in FIG. 13.

Figure 13:
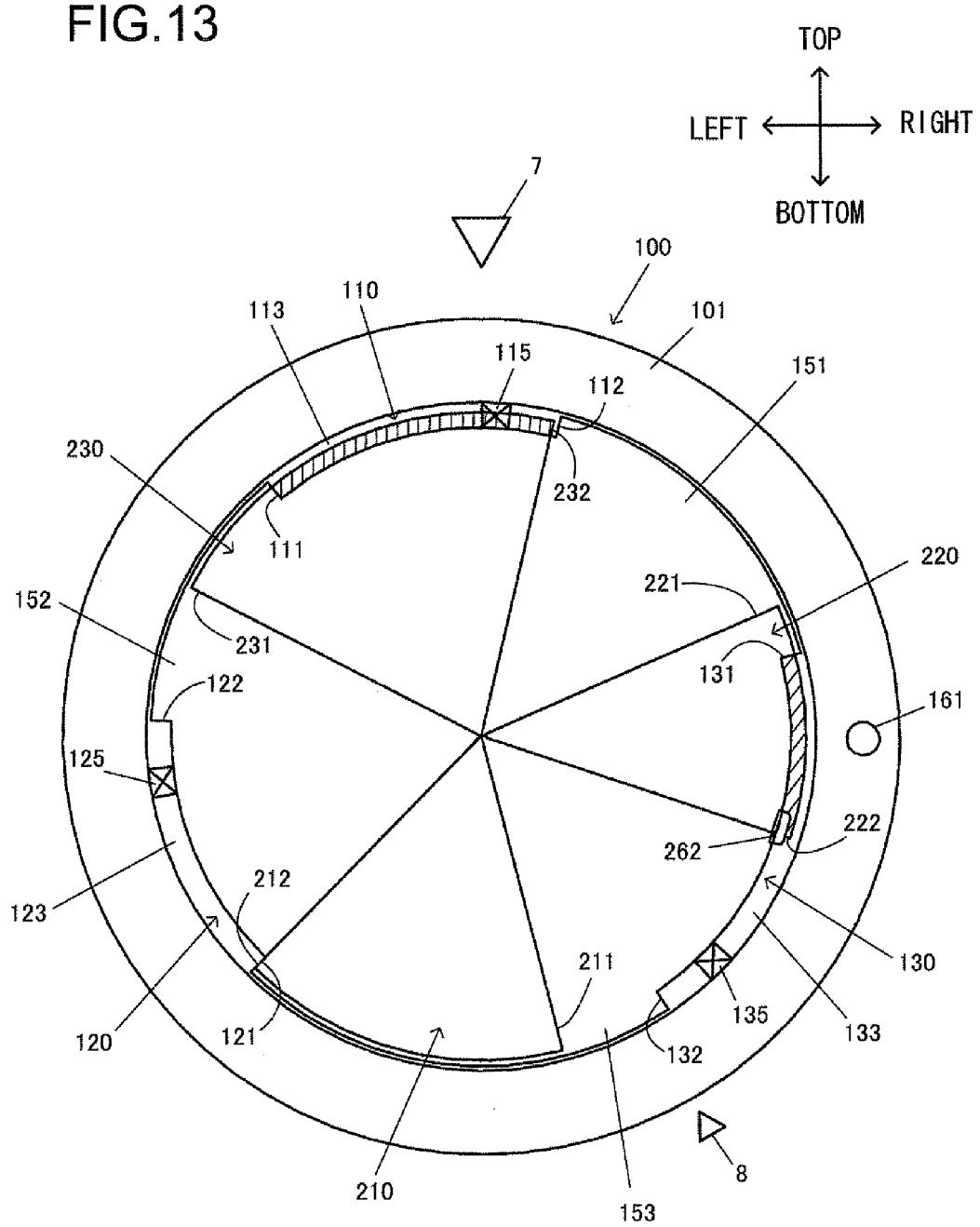
FIG. 13 shows a specific state of interference (state of overlap) between the body-side tabs and the accessory-side tabs.

A further counterclockwise turn of the photographic lens 2 in the state shown in FIG. 13 will cause a decrease in both the contact area over which the rear surface 223 of the accessory-side second tab 220 and the front surface 133 of the body-side third tab 130 are in contact with each other and the contact area over which the rear surface 233 of the accessory-side third tab 230 and the front surface 113 of the body-side first tab 110 are contact with each other. In other words, FIG. 13 shows a state in which the contact of the rear surface 223 of the accessory-side second tab 220 and the front surface 133 of the body-side third tab 130 and the contact of the rear surface 233 of the accessory-side third tab 230 and the front surface 113 of the body-side first tab 110 are achieved at the two contact locations over the largest contact area.

Figure 14:
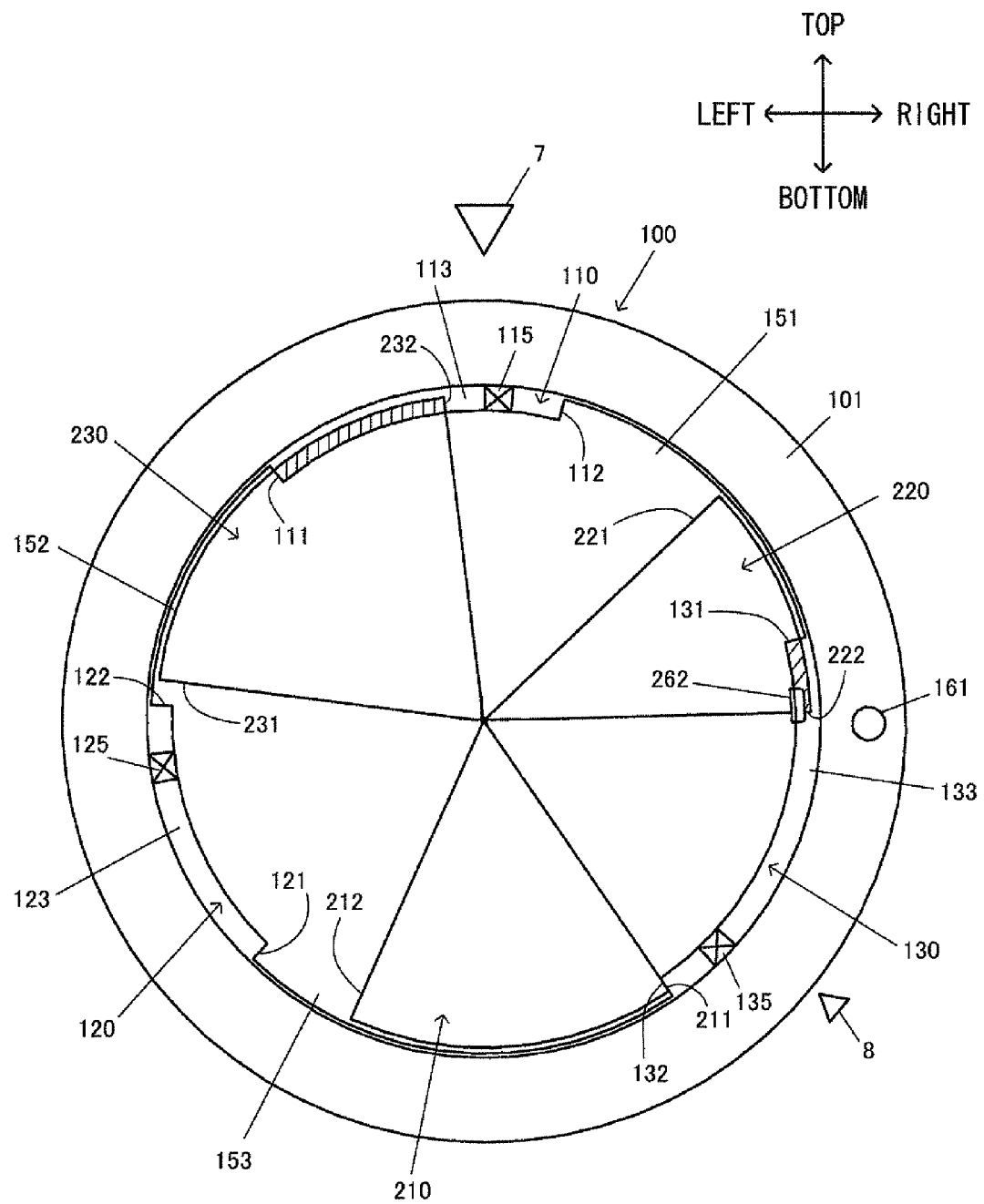
FIG. 14 shows a specific state of interference (state of overlap) between the body-side tabs and the accessory-side tabs.

FIG. 14 shows a state achieved by further turning the photographic lens 2 along the counterclockwise direction relative to the state shown in FIG. 13. Among various states in which the rear surface 223 of the accessory-side second tab 220 and the front surface 133 of the body-side third tab 130 contact each other and the rear surface 233 of the accessory-side third tab 230 and the front surface 113 of the body-side first tab 110 contact each other at a total of two contact locations, the accessory-side tabs and the body-side tabs contact each other over the smallest area in this state.

Figure 15:
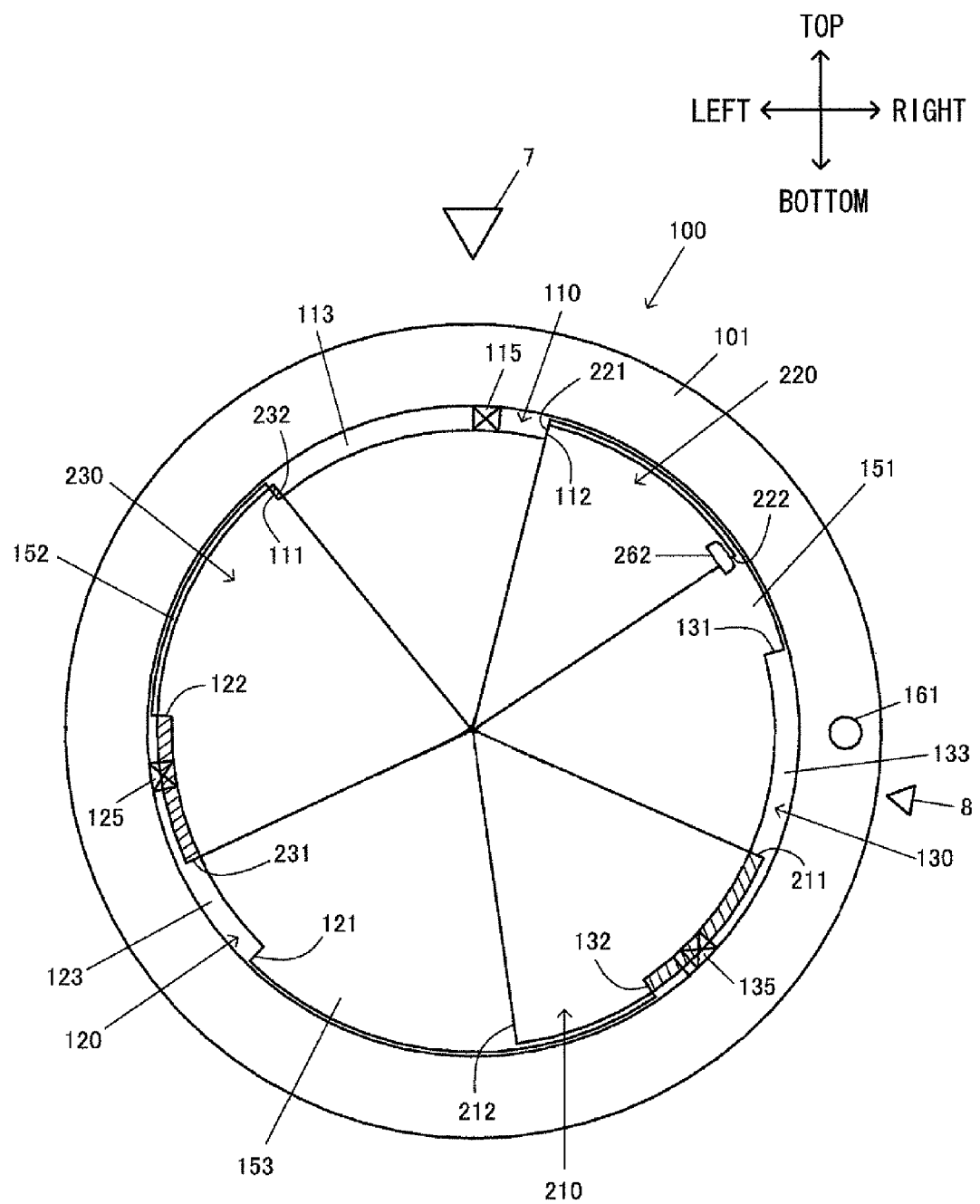
FIG. 15 shows a specific state of interference (state of overlap) between the body-side tabs and the accessory-side tabs.

A slight counterclockwise turn of the photographic lens 2 relative to the state shown in FIG. 14 will allow the rear surface 213 of the accessory-side first tab 210 and the front surface 133 of the body-side third tab 130 to come into contact with each other. At this time, contact will be achieved by the body-side tabs 110 to 130 and the accessory-side tabs 210 to 230 at a total of three contact locations. As the photographic lens 2 in this state is turned further along the counterclockwise direction in the figure, the rear surface 233 of the accessory-side third tab 230 and the front surface 123 of the body-side second tab 120 will come into contact with each other. In this state, contact will be achieved by the body-side tabs 110 to 130 and the accessory-side tabs 210 to 230 at a total of four contact locations. As the photographic lens 2 in this state is turned further along the counterclockwise direction in the figure, the rear surface 223 of the accessory-side second tab 220 and the front surface 133 of the body-side third tab 130 will cease contact with each other. At this time, contact will be achieved by the body-side tabs 110 to 130 and the accessory-side tabs 210 to 230 at a total of three contact locations. As the photographic lens 2 in this state is rotated further along the counterclockwise direction in the figure, the rear surface 233 of the accessory-side third tab 230 ceases contact with the front surface 113 of the body-side first tab 110, as shown in FIG. 15. Thus, the body-side tabs 110 through 130 and the accessory-side tabs 210 through 230 contact each other at a total of two contact locations.

As the photographic lens 2 in the state shown in FIG. 15, is slightly turned along the counterclockwise direction, the rear surface 223 of the accessory-side second tab 220 and the front surface 113 of the body-side first tab 110 will come into contact with each other. In this state, the body-side tabs 110 through 130 and the accessory-side tabs 210 through 230 are in contact at a total of three locations. As the photographic lens 2 is turned further along the counterclockwise direction in the figure, the correct interlock phase shown in FIG. 7 will be reestablished and any contact (interference) between the body-side tabs 110 to 130 and the accessory-side tabs 210 to 230 will cease.

—Rationale for Disposing the Restricting Member 262 at the Accessory-Side Second Tab 220—

In the embodiment, the restricting member 262 is disposed at the accessory-side second tab 220 so as to achieve the following advantages.

(1) Among the three tabs (210, 220 and 230) present on the accessory-side, the accessory-side second tab 220 ranges over the shortest distance along the circumference of the camera accessory mount 200. In other words, the accessory-side second tab 220 assumes the shortest circular arc length among the three tabs. This means that the exchangeable lens 2 can be mounted at the camera body 1 at the correct interlock phase simply by rotating the exchangeable lens 2 by an extent matching the circular arc length of the accessory-side second tab 220. Likewise, the exchangeable lens 2 can be dismounted from the camera body 1 simply by rotating the exchangeable lens 2 (along the direction opposite from the direction in which it is rotated during the mounting operation) by the extent matching the circular arc length of the accessory-side second tab 220. Namely, by disposing the restricting member at the accessory-side tab 220, the extent to which the user needs to rotate the accessory to mount or dismount it can be minimized. Consequently, the rotating operation onus placed on the user while mounting or dismounting the accessory (exchangeable lens 2) can be reduced and the length of time required to mount or dismount the accessory (exchangeable lens 2) can also be reduced.

(2) In the embodiment, a single restricting member 262 is used both to restrict the range of rotation when mounting the accessory and to restrict the range of rotation when dismounting the accessory, instead of using two separate restricting members in correspondence to the mounting operation and the dismounting operation. As a result, the number of required parts can be minimized and the mount structure can be simplified.

(3) The restricting member 262 located at the second tab 220 physically contacts a tab end of a body-side tab, which is present at a position where damage does not occur readily while the camera is in use. In other words, the restricting member 262 restricts the range of rotation of the accessory (exchangeable lens 2) being mounted or dismounted by coming into physical contact with an end portion (an end portion of the body-side tab) located at a less vulnerable position.

This point is explained in further detail below. The accessory-side second tab 220 at which the restricting member 262 is disposed moves through the body-side second gap 152 with the narrowest angular range along the circumferential edge of the circular opening at the camera body 1 while the photographic lens 2 is being mounted (at the correct interlock phase). The angular range of the body-side second gap 152 along the circumferential edge of the circular opening at the camera body 1 is 47.5°. This means that the accessory-side first tab 210 (with its angular range of 58.5°) and the accessory-side third tab 230 (with its angular range of 71.5°), assuming greater angular ranges than the 47.5° angular range, cannot pass through the body-side second gap 152. Thus, at any phase other than the correct interlock phase, there is no risk of the accessory-side first tab 210 or the accessory-side third tab 230 moving into the body-side second gap 152 and consequently, the first side end 111 of the body-side first tab 110 and the second side end 122 of the body-side second tab 120, which define the angular range of the body-side second gap 152, are less likely to be damaged.

The following problem would arise if the first side end 111 of the body-side first tab 110 and the second side end 122 of the body-side second tab 120 were susceptible to damage.

As explained earlier, the first side end 111 of the body-side first tab 110 comes in contact with the restricting member 262 while the photographic lens 2 is being dismounted from the camera body 1 so that the photographic lens 2 does not rotate along the dismounting direction any more than necessary. Thus, if the first side end 111 of the body-side first tab 110 becomes damaged and, for instance, chipped, the photographic lens 2 will be allowed to rotate along the dismounting direction further than necessary. Under such circumstances, the second side end 212 of the accessory-side first tab 210 may move further rearward relative to the body-side third tab 130 or the second side end 232 of the accessory-side third tab 230 may move further rearward relative to the body-side second tab 120, causing the photographic lens 2 to jam at the camera body 1.

As explained earlier, the second side end 122 of the body-side second tab 120 comes in contact with the restricting member 262 while the photographic lens 2 is being mounted at the camera body 1 by the user holding down the lens release button so as to ensure that the photographic lens 2 is not allowed to rotate along the mounting direction any further than necessary. As the photographic lens 2 mounted at the camera body 1 while holding down the lens release button (not shown) is turned along the mounting direction until the restricting member 262 comes in contact with the second side end 122 of the body-side second tab 120, the position of the lens retainer lock pin 9 and the position of the pin hole 261 at the camera accessory mount 200 may become slightly offset relative to each other. However, since the lens retainer lock pin 9 has a rounded end, the camera accessory mount 200, having rotated by a greater extent than necessary along the mounting direction, will be repositioned to assume the correct phase, as the lens retainer lock pin 9, driven with the force imparted from the spring (not shown), passes through the pin hole 261 once the user releases the lens release button, provided that the offset of the pin hole 261 is slight.

If the second side end 122 at the body-side second tab 120 becomes damaged, however, the position of the lens retainer lock pin 9 and the position of the pin hole 261 at the camera accessory mount 200 may become offset relative to each other by a significant extent as the photographic lens 2 is mounted at the camera body 1 while the lens release button (not shown) is held down. Under such circumstances, even if the user releases the lens release button, the lens retainer lock pin 9 will be unable to pass through the pin hole 261 and thus the camera accessory mount 200, having turned along the mounting direction by an excessive extent, will not resume the correct phase. As a result, problems such as disabled photographing operation due to an offset of the contact position at which a body-side electric contact point and an accessory-side electric contact point achieve electrical contact, as will be described later.

In the embodiment, it is ensured that the first side end 111 of the body-side first tab 110 and the second side end 122 of the body-side second tab 120 are less susceptible to damage as described above, so as to prevent such problems and provide a more reliable camera system.

—Accessory-Side Third Tab 230

As explained earlier, the front surface 234 of the accessory-side third tab 230 is pressed by the spring 136 at the body-side third tab 130 over an area near the first side end 231 and whenever an excessive external force is applied, the front surface 234 will come into contact with the contact portion 135. This means that when the photographic lens 2 is mounted at the camera body 1, the force applied to lock the photographic lens 2 to the camera body 1 will be applied primarily to the area near the first side end 231 at the accessory-side third tab 230.

—Body-Side First Tab 110—

When contact is achieved by the body-side tabs 110 to 130 and the accessory-side tabs 210 to 230 at a total of two contact locations with the body-side first tab 110 in contact with an accessory-side tab at one of the contact locations, the body-side first tab 110 invariably contacts the accessory-side tab 210, 220 or 230 on the side where its first side end 111 is located (i.e., at the front surface 113 near the first side end 111), rather than on the side where its second side end 112 is located (i.e., at the front surface 113 near the second side end 112), as shown in FIGS. 11, 13 and 14. In other words, when contact is achieved by the body-side tabs 110 to 130 and the accessory-side tabs 210 to 230 at a total of two contact locations and the body-side first tab 110 achieves contact at one of the contact locations, the function of preventing erroneous insertion is achieved in the area near the first side end 111 of the body-side first tab 110.

The spring 116 is disposed adjacent to the contact portion 115 at the body-side first tab 110 over the area near its second side end 112. Namely, the function of locking the photographic lens 2 having been mounted at the camera body 1 is achieved over the area near the second side end 112 of the body-side first tab 110.

In summary, the body-side first tab 110 is formed so that different functions are achieved in the area near the first side end 111 and the area near the second side end 112 along the direction in which the body-side first tab 110 extends.

—Body-Side Electric Contact Point and Accessory-Side Electric Contact Point—

Figure 20:
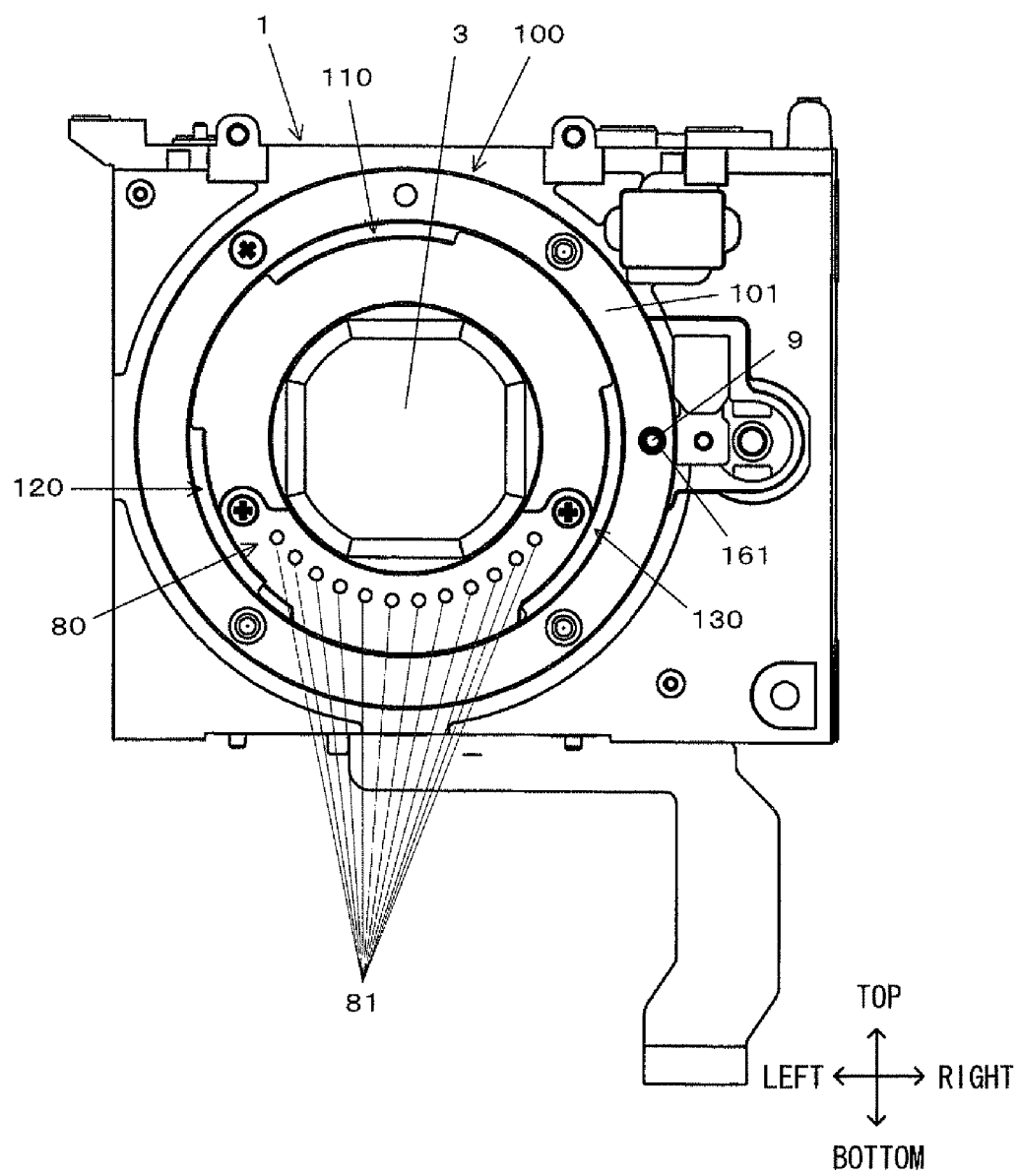
FIG. 20 is a front view of the camera body mount attached to the camera body and an area around the camera body mount.
Figure 21:
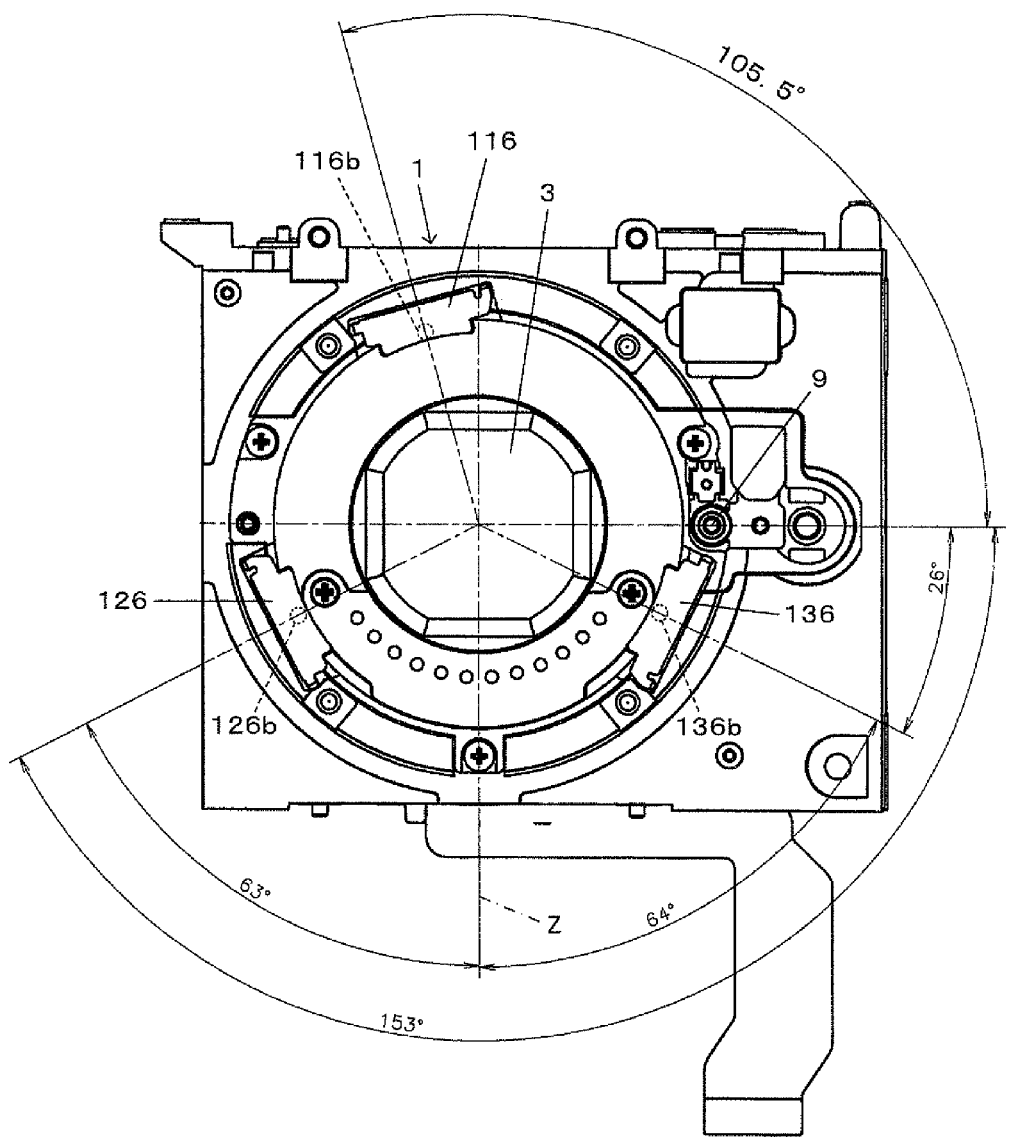
FIG. 21 shows the camera body in FIG. 20 minus the camera body mount.

FIG. 20 is a front view of the camera body mount 100 at the camera body 1 and an area around the camera body mount 100 minus the external components that would normally be mounted at the camera body 1. FIG. 21 shows the camera body 1 in FIG. 20 without the camera body mount 100. At the camera body 1, a camera body-side electric contact point (body-side electric contact point) 80 is provided at a position further inward relative to the opening of the camera body mount 100. The body-side electric contact point 80 includes a plurality of terminals 81 via which electric power is exchanged and control signals are exchanged with an accessory-side electric contact point, to be described later, located at the photographic lens 2. A force is applied to the individual terminals 81, which are disposed substantially concentrically with the body-side tabs 110 to 130, along the forward direction by a spring (not shown) and thus, the terminals 81 can be made to move forward or backward. The terminals 81 are disposed in a symmetrical formation to the left and to the right relative to an axis (the z-axis in FIG. 21), which intersects the center of the photographic optical path 3 at the camera body 1 assuming the lateral orientation (i.e., intersecting the optical axis of the subject light) and extends along the vertical direction.

As illustrated in FIG. 21, the spring 116 is disposed near the rear surface 114, the spring 126 is disposed near the rear surface 124 and the spring 136 is disposed near the rear surface 134 at the camera body mount 100, as has been explained earlier. A dotted-line circle mark assigned with reference numeral 116*b* in FIG. 21 indicates a position at which the force imparted by the spring 116 is applied (pressure is applied) to a force application portion (to be described later) of the front surface 214 of the accessory-side first tab 210, i.e., the position (spring force pressing position) assigned with reference numeral 116*a* in FIG. 8. Likewise, reference numeral 126*b* in FIG. 21 indicates a position at which the force imparted by the spring 126 is applied (pressure is applied) to a force application portion (to be described later) of the front surface 224 of the accessory-side second tab 220, i.e., the position assigned with reference numeral 126*a* in FIG. 8. In addition, reference numeral 136*b* in FIG. 21 indicates a position at which the force imparted by the spring 136 is applied (pressure is applied) to a force application portion (to be described later) of the front surface 234 of the accessory-side third tab 230, i.e., the position assigned with reference numeral 136*a* in FIG. 8.

The spring force pressing position 116*b* assumes an angle of 105.5° along the counterclockwise direction in reference to the three o'clock direction taken when the camera body mount 100 is viewed from the front side of the camera body 1. The spring force pressing position 126*b* assumes an angle of −153° along the counterclockwise direction in reference to the three o'clock direction taken when the camera body mount 100 is viewed from the front side of the camera body 1. The spring force pressing position 136*b* assumes an angle of −26° along the counterclockwise direction in reference to the three o'clock direction taken when the camera body mount 100 is viewed from the front side of the camera body 1.

It is to be noted that the spring force pressing position 126*b* assumes an angle of 63° along the clockwise direction in reference to the six o'clock direction taken when the camera body mount 100 is viewed from the front side of the camera body 1. The spring force pressing position 136*b* assumes an angle of 64° along the counterclockwise direction in reference to the six o'clock direction taken when the camera body mount 100 is viewed from the front side of the camera body 1. This means that the spring force pressing positions 126*b* and 136*b* are located substantially symmetrically on the left and the right of the z-axis in FIG. 21.

Figure 22:
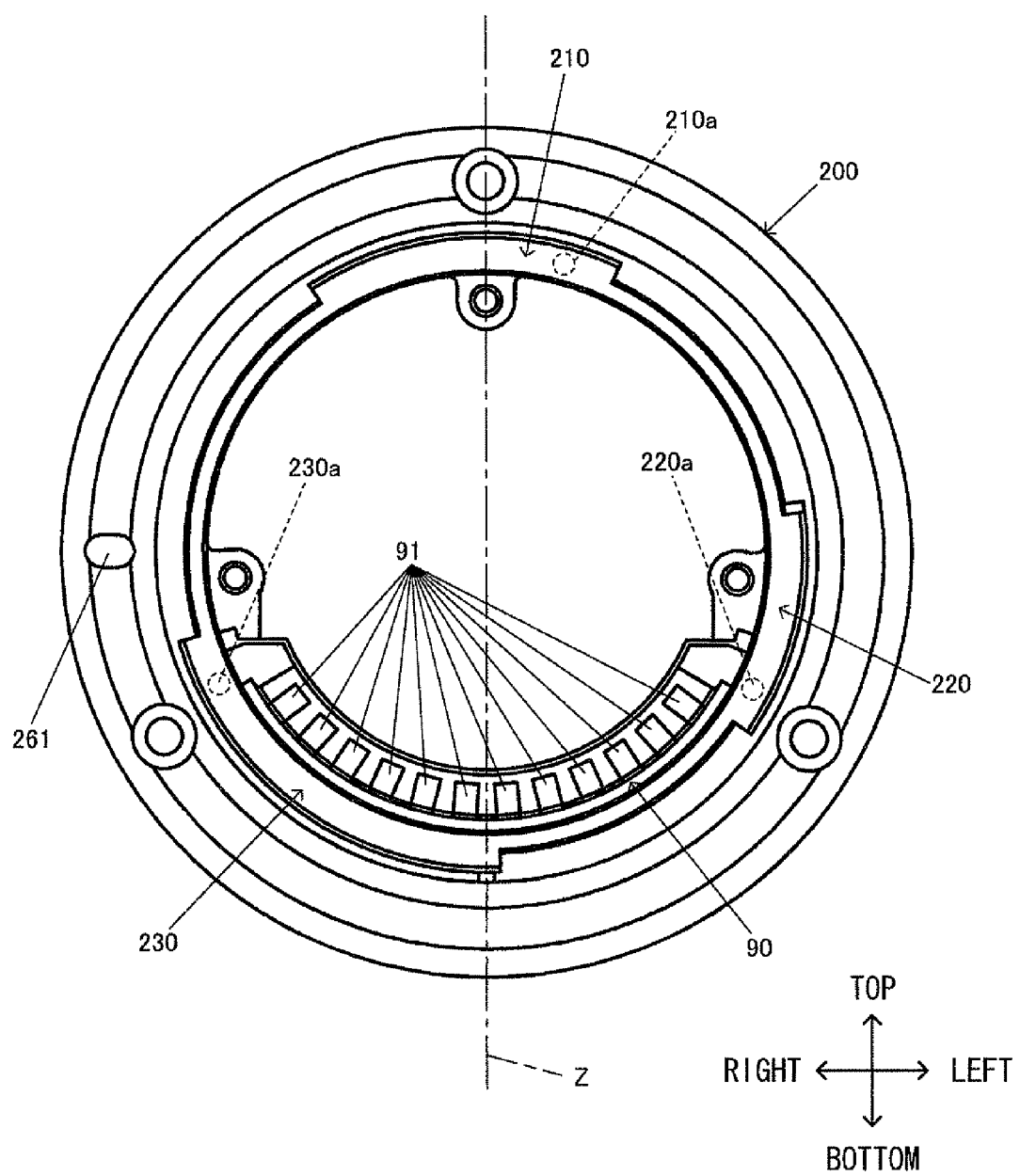
FIG. 22 is a rear view of the camera accessory mount attached to the photographic lens and an area around the camera accessory mount.

FIG. 22 shows the camera accessory mount 200 attached to the photographic lens 2 and an area around the camera accessory mount 200 in a view taken from the rear side. An accessory-side electric contact point 90 is disposed further inward relative to the opening of the camera accessory mount 200. The accessory-side electric contact point 90 includes a plurality of terminals 91 via which electric power and control signals are exchanged with the terminals 81 in the body-side electric contact point 80 when the photographic lens 2 is fully mounted. The terminals 91 are disposed substantially concentrically to the accessory-side tabs 210 to 230, each in correspondence to one of the terminals 81 at the body-side electric contact point 80. The terminals 91 are disposed symmetrically to the left and to the right relative to the axis (z-axis in FIG. 22) extending along the top/bottom direction in the fully mounted state.

A dotted-line circle mark assigned with reference numeral 220*a* in FIG. 22 indicates a position at which the force imparted by the spring 126 at the camera body mount 100 is applied (pressure is applied) to the front surface 224 of the accessory-side second tab 220 of the photographic lens 2 mounted at the camera body 1, i.e., the position corresponding to the position assigned with reference numerals 126*a* in FIG. 8 (a force application portion 220*a* of the accessory-side second tab 220 at which the force imparted by the spring 126 is applied to the camera lens mount). Likewise, reference numeral 230*a* indicates a position at which the force imparted by the spring 136 at the camera body mount 100 is applied (pressure is applied) to the front surface 234 of the accessory-side third tab 230, i.e., the position corresponding to the position assigned with reference numeral 136*a* in FIG. 8 (a force application portion 230*a* of the accessory-side second tab 230 at which the force imparted by the spring 136 is applied to the camera lens mount).

It is to be noted that a dotted-line circle mark assigned with reference numeral 210*a* in FIG. 22 indicates a position at which the force imparted by the spring 116 at the camera body mount 100 is applied (pressure is applied) to the front surface 214 of the accessory-side first tab 210 of the photographic lens 2 mounted at the camera body 1, i.e., the position corresponding to the position assigned with register numeral 116*a* in FIG. 8 (a force application portion 210*a* of the accessory-side first tab 210 at which the force imparted by the spring 116 is applied to the camera lens mount).

As the photographic lens 2 is mounted at the camera body 1, the terminals at the accessory-side electric contact point 90 each come into contact with one of the terminals 81 at the body-side electric contact point 80 and pushes the corresponding terminal toward the rear, thereby establishing electrical connection with the terminals 91 become electrically connected to the terminals 81. Since the terminals 81 are disposed in a symmetrical formation to the left and to the right of the z-axis in FIG. 21 and the spring force pressing positions 126*b* and 136*b* (i.e., the force application portions 220*a* and 230*a*) substantially achieve left/right symmetry relative to the z-axis in FIGS. 21 and 22, the forces imparted by the springs 126 and 136 are applied to the individual terminals 91 at the accessory-side electric contact point 90 with substantially left/right symmetry relative to the z-axis in FIG. 21. This means that since the individual terminals 81 are more likely to contact the corresponding terminals 91 with practically uniform contact forces, stability in the electrical connection between the terminals 81 and the terminals 91 is assured.

It is to be noted that the force application portion 210*a* of the accessory-side first tab 210, the force application portion 220*a* of the accessory-side second tab 220 and the force application portion 230*a* of the accessory-side third tab may be formed so as to assure greater strength (durability) compared to the strength (durability) of the other portions of the tabs 210, 220 and 230. In such a case, it is desirable to improve the durability of the two force application portions 220*a* and 230*a* disposed substantially symmetrically to the left and right of the z-axis in FIG. 21, through similar methods by adopting similar structural features.

For instance, the strength at the force application portions 210*a*, 220*a* and 230*a* may be improved by increasing the thickness of the tabs (the thickness along the optical axis) over these areas.

As an alternative, a higher level of strength may be achieved by reinforcing (e.g., by bonding metal pieces) the force application portions 210*a*, 220*a* and 230*a* with a material (such as a metal material) assuring high strength. In this case, the areas of the front surfaces 214, 224 and 234 at the tabs 210, 220 and 230, which correspond to the force application portions 210*a*, 220*a* and 230*a*, may be reinforced or reinforcement may be provided on the rear surfaces of the tabs 210, 220 and 230.

As a further alternative, provided that the camera lens mount is constituted with a plastic material (provided that the three tabs are also formed by using a plastic material), the force application portions 210*a*, 220*a* and 230*a* may be formed by using a plastic material assuring a higher level of strength than the plastic material used to form the lens mount and the tabs. Alternatively, the force application portions 210*a*, 220*a* and 230*a* may be reinforced with a material assuring a high level of strength (such as a metal material) as has been suggested earlier. In such a case, the reinforcement may be provided over areas corresponding to the force application portions 210*a*, 220*a* and 230*a* either on the front surfaces 214, 224 and 234 or on the rear surfaces of the individual tabs 210, 220 and 230, as has been described above.

By reinforcing the force application portions 210*a*, 220*a* and 230*a* as described above, a structure that assures even better uniformity with regard to the forces with which the terminals 81 and the terminals 91 contact each other is achieved, making it possible to assure further stability in the electrical connection between the terminals 81 and the terminals 91.

It is to be noted that the reinforcement does not need to be provided at the force application portions at all the tabs 210, 220 and 230, as long as the force application portions of at least the two tabs 220 and 230 (the tabs substantially symmetrically disposed to the left and to the right of the z-axis in FIG. 21) are reinforced.

The camera body 1 and the photographic lens 2 in the embodiment structured as described above achieve the following advantages.

(1) The terminals 81 are disposed in a symmetrical formation to the left and to the right of the z-axis in FIG. 21 and the spring force pressing positions 126*b* and 136*b* are set symmetrically to the left and to the right of the z-axis in FIG. 21, with forces applied to the accessory-side tabs along the rearward direction at the spring force pressing positions 126*b* and 136*b*. In addition, the terminals 91 at the accessory-side electric contact point 90 are each disposed in correspondence to one of the terminals 81 at the body-side electric contact point 80. As a result, it is ensured that the terminals 81 and the terminals 91 are more likely to contact each other with practically uniform contact force, thereby assuring stability in the electrical connection between the terminals 81 and the terminals 91.

(2) In the embodiment, by disposing the restricting member 262 at the accessory-side second tab 220 assuming the smallest length along the circumference of the camera accessory mount 200, the extent to which the user needs to rotate the accessory to mount or dismount it can be minimized. Consequently, the rotating operation onus placed on the user while mounting or dismounting the accessory can be reduced and the length of time required to mount or dismount the accessory can be reduced as well.

(3) In the embodiment, a single restricting member 262 is used both to restrict the range of rotation when mounting the accessory and to restrict the range of rotation when dismounting the accessory. As a result, the number of required parts can be minimized and the mount structure can be simplified.

(4) In the embodiment, the restricting member 262 located at the second tab 220 physically contacts a tab end of a body-side tab, which is present at a position where damage does not occur readily. In other words, the restricting member 262 restricts the range of rotation of the accessory being mounted or dismounted by coming into physical contact with an end portion (an end portion of the body tab) located at a less vulnerable position. As a result, a rotation regulating structure assuring a high level of durability is achieved, which, in turn, ultimately makes it possible to improve the durability of the bayonet-type mount structure.

In other words, the body-side second gap 152 is formed so as to assume a narrower angular range along the circumferential edge of the circular opening at the camera body 1, compared to the other body-side gaps 151 and 153, so as to ensure that the accessory-side first tab 210 or the accessory-side third tab 230 does not move into the body-side second gap 152 at any phase other than the correct interlock phase and thus improve the durability of the bayonet mount structure as described above.

(5) Three accessory-side tabs 210 to 230 assuming a uniform size and disposed over equal intervals and three body-side tabs 110 to 130 assuming a uniform size and disposed over equal intervals will allow the photographic lens 2 to be mounted at the camera body 1 at any phase other than the correct interlock phase. Accordingly, the three accessory-side tabs 210 to 230 are formed in varying sizes and are disposed over varying intervals. The three body-side tabs 110 to 130 are also formed in varying sizes and disposed over varying intervals. In addition, even if the user attempts to insert the photographic lens 2 at any phase other than the correct interlock phase, at least two tabs among the body-side tabs 110 to 130 and at least two tabs among the accessory-side tabs 210 to 230 come into contact with each other at a total of at least two contact locations, so as to disallow insertion of the camera accessory mount 200 through the camera body mount 100. For instance, when contact is achieved by a camera accessory mount tab and a camera body mount tab at a single contact location, the other two contact-free tabs on the accessory-side may assume positions between camera body-side tabs. However, contact is invariably achieved in the embodiment by the body-side tabs 110 to 130 and the accessory-side tabs 210 to 230 at, at least, two contact locations at any phase other than the correct interlock phase as described above, and consequently, erroneous mounting of the camera accessory can be reliably prevented.

(6) The restricting member 262, which comes in contact with the second side end 122 of the body-side second tab 120 and the first side end 111 of the body-side first tab 110, restricts the ranges over which the photographic lens 2 can be turned along the mounting direction and along the dismounting direction. Since the rotational range of the photographic lens 2 along the mounting direction and the dismounting direction can be restricted via a single member assuming a simple shape, the manufacturing costs of the camera body mount 100 and the camera accessory mount 200 can be minimized.

(7) The restricting member 262 is disposed near a side end of the accessory-side second tab 220 assuming a smallest length along the circumference of the camera accessory mount 200. At the correct interlock phase, the accessory-side second tab 220 passes through the body-side second gap 152, which extends over an angular range of 47.5° along the circumferential edge of the circular opening of the camera body 1. In addition, the mounting angle assumed in the embodiment is 40.5°. This means that a range, over which the restricting member 262 is allowed to move between the second side end 122 of the body-side second tab 120 and the first side end 111 of the body-side first tab 110 within the angular range (47.5°) of the body-side second gap 152, is equivalent to the mounting angle. Accordingly, by disposing the restricting member 262 near a side end of the accessory-side second tab 220 assuming the smallest length along the circumference of the camera accessory mount 200, the mounting angle for the mount system constituted with the camera body mount 100 and the camera accessory mount 200 is defined. From a different perspective, the mounting angle setting can be rationalized as described below and the sizes of the body-side second gap 152 and the accessory-side second tab 220 may be regarded to have been set in correspondence to the mounting angle rationalized as described below. In any case, these structural features achieve a rational overall structure with no superfluous structural elements, to contribute toward minimization of the overall weight.

It is to be noted that at a smaller mounting angle, the accessory can be mounted with greater ease, the extent to which the terminals 81 at the camera body 1 and the terminals 91 at the photographic lens 2 slide against each other can be reduced and the extent of wear of the terminals occurring whenever the photographic lens 2 is exchanged can be reduced. However, if the mounting angle is very small, tabs engaged with each other may become inadvertently disengaged from each other, and in such a case, the photographic lens 2 may fall from the camera body. At the same time, the camera body mount 100 must assume a certain circumferential dimension in order to accommodate the springs 116, 126 and 136, the contact portions 115, 125 and 135 and the tapered surfaces 117, 127 and 137. Moreover, a sufficient mounting angle is required to ensure that the accessory-side tabs 210 to 230 are allowed to be reliably seated relative to the springs 116, 126 and 136 and the contact portions 115, 125 and 135 beyond the tapered surfaces 117, 127 and 137. The mounting angle of 40.5° adopted in the embodiment has been determined by taking into consideration all these factors.

(8) While the weight distribution of the photographic lens 2 is such that the photographic lens 2 tends to pull down on its front side (subject side), the forces applied from the springs 116, 126 and 136 sustain the camera accessory mount reference surface 201 in contact with the camera body mount reference surface 101 under typical operating conditions. However, if an external force exceeding the force of the springs, working along a direction matching that of gravity, is applied to the photographic lens 2 in a photographing state with the camera body 1 in the upright attitude fixed to, for instance, a tripod, the spring 116 at the uppermost body-side first tab 110 will flex further to allow the front surface 214 of the accessory-side first tab 210 to come in contact with the contact portion 115 of the body-side first tab 110.

Figure 16:
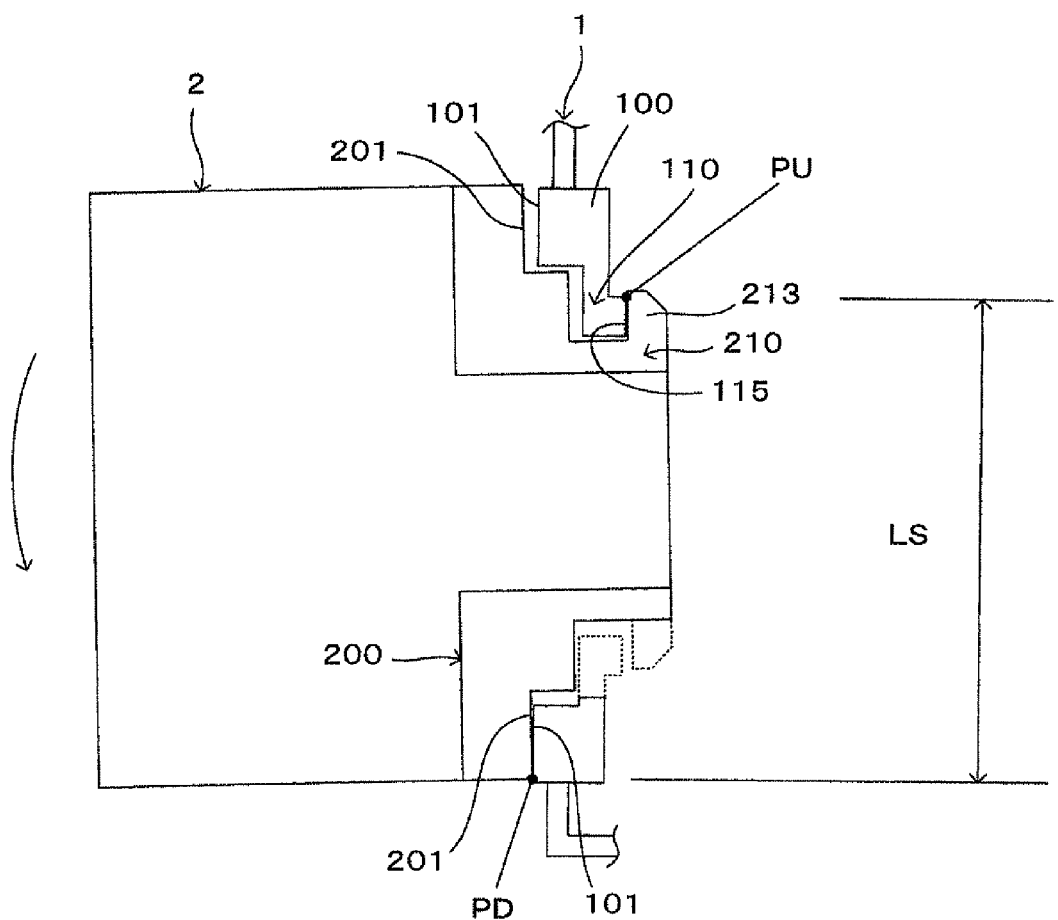
FIG. 16 illustrates the relationship between the camera body mount and the camera accessory mount that will manifest if an excessive external force is applied to the photographic lens along the direction matching that of gravitational force.

FIG. 16 illustrates this condition. It is to be noted that the intervals and the like formed between the individual parts are exaggerated in FIG. 16 so as to provide a clear illustration. In the state shown in FIG. 16, the camera accessory mount reference surface 201 and the camera body mount reference surface 101 are in contact with each other at a point PD on the lower side, the front surface 214 of the accessory-side first tab 210 and the contact portion 115 of the body-side first tab 110 are in contact with each other at a point PU on the upper side as described above, and the weight of the photographic lens 2 and the external force applied to the photographic lens 2 are supported at these two points. Accordingly, the force applied to the two points PD and PU can be reduced by maximizing the distance LS extending along the vertical direction (along the direction of gravitational force) between the two points PD and PU.

This situation will not arise in a normal photographing condition unless an unintended external force is applied.

However, the photographic lens 2, which normally assumes a cylindrical shape, tends to come into contact with various objects in real-world usage and may be employed in a range of circumstances. For this reason, the condition shown in FIG. 16 may be expected to arise fairly often and therefore, it is important to devise measures to effectively address the issues arising from such circumstances.

Figure 17:
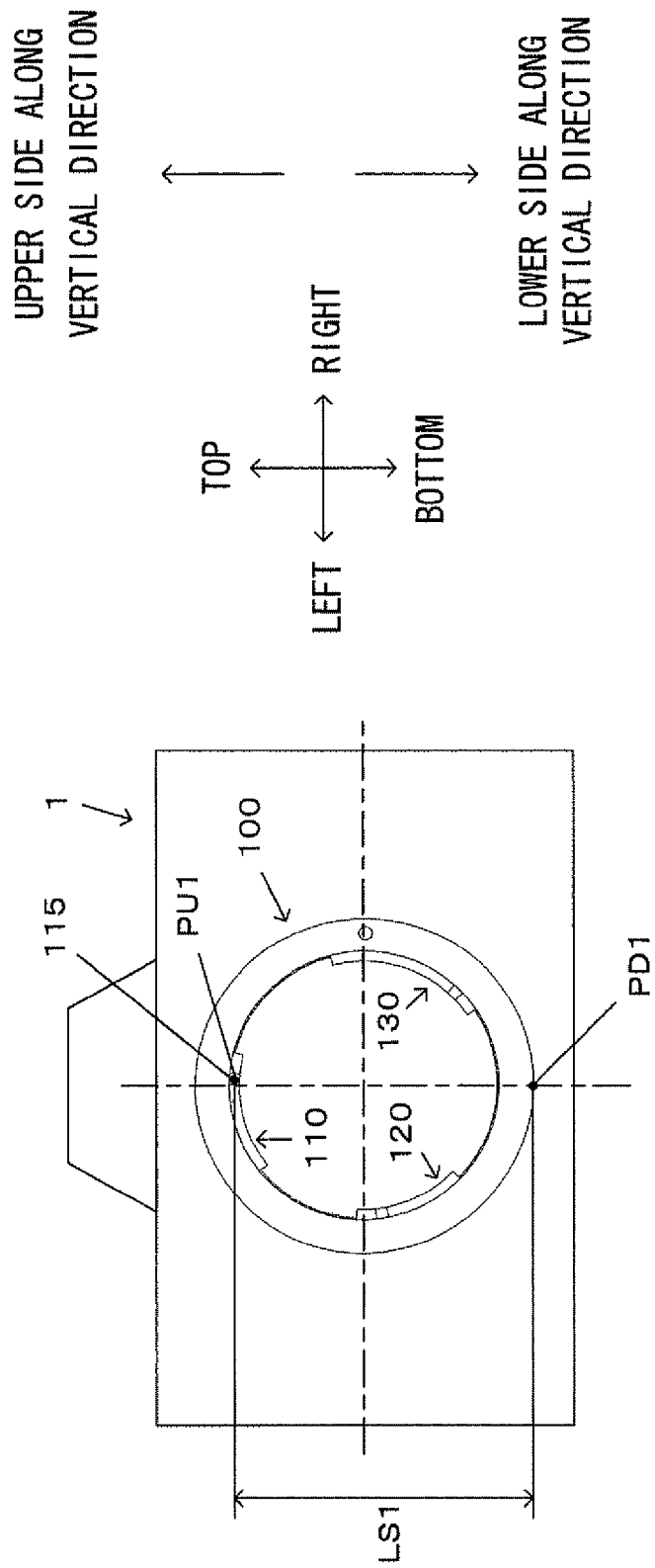
FIG. 17 indicates the contact points PD and PU and the distance LS assumed when the camera body is in a lateral orientation.
Figure 18:
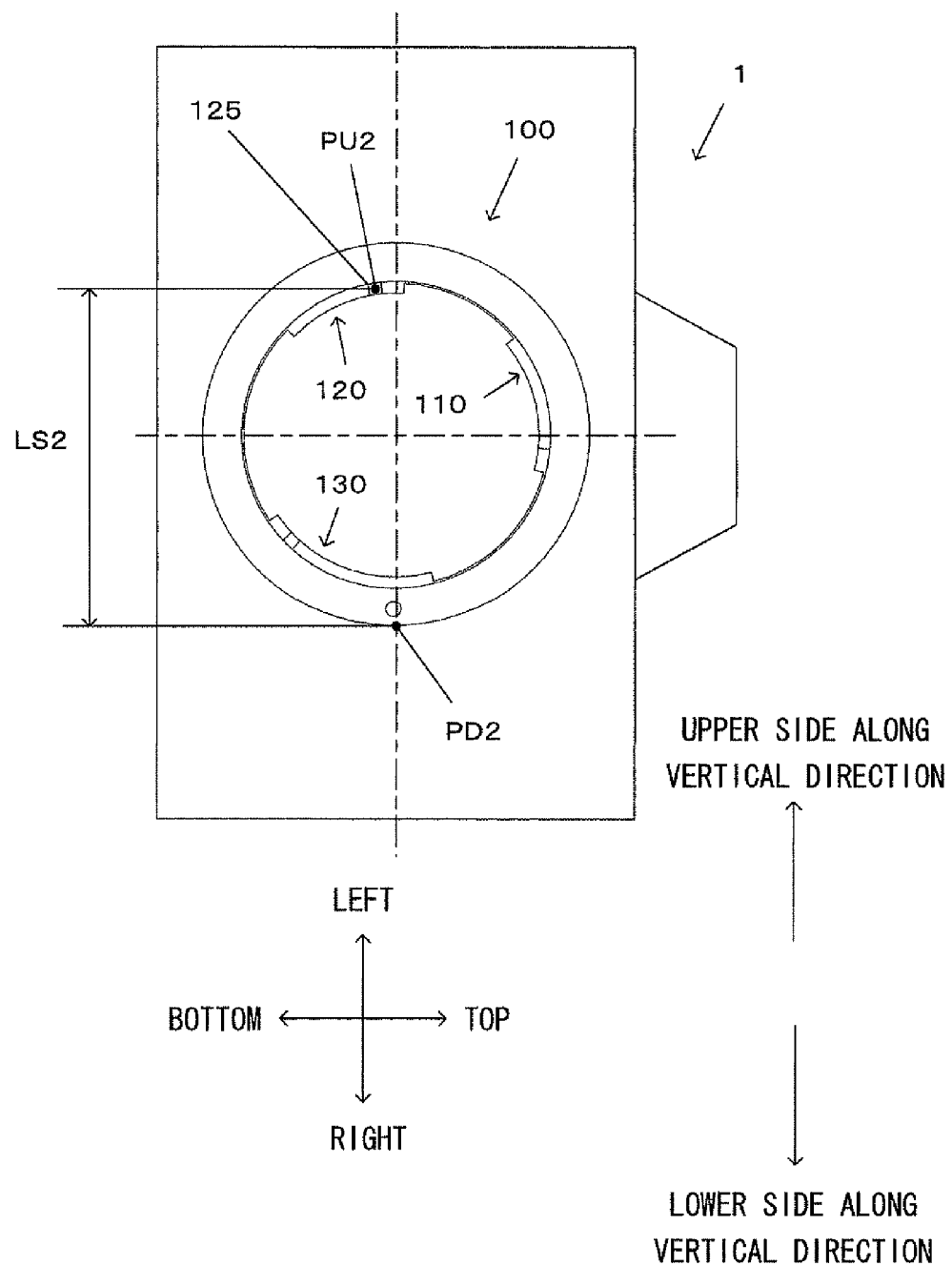
FIG. 18 indicates the contact points PD and PU and the distance LS assumed when the camera body is in a longitudinal orientation.
Figure 19:
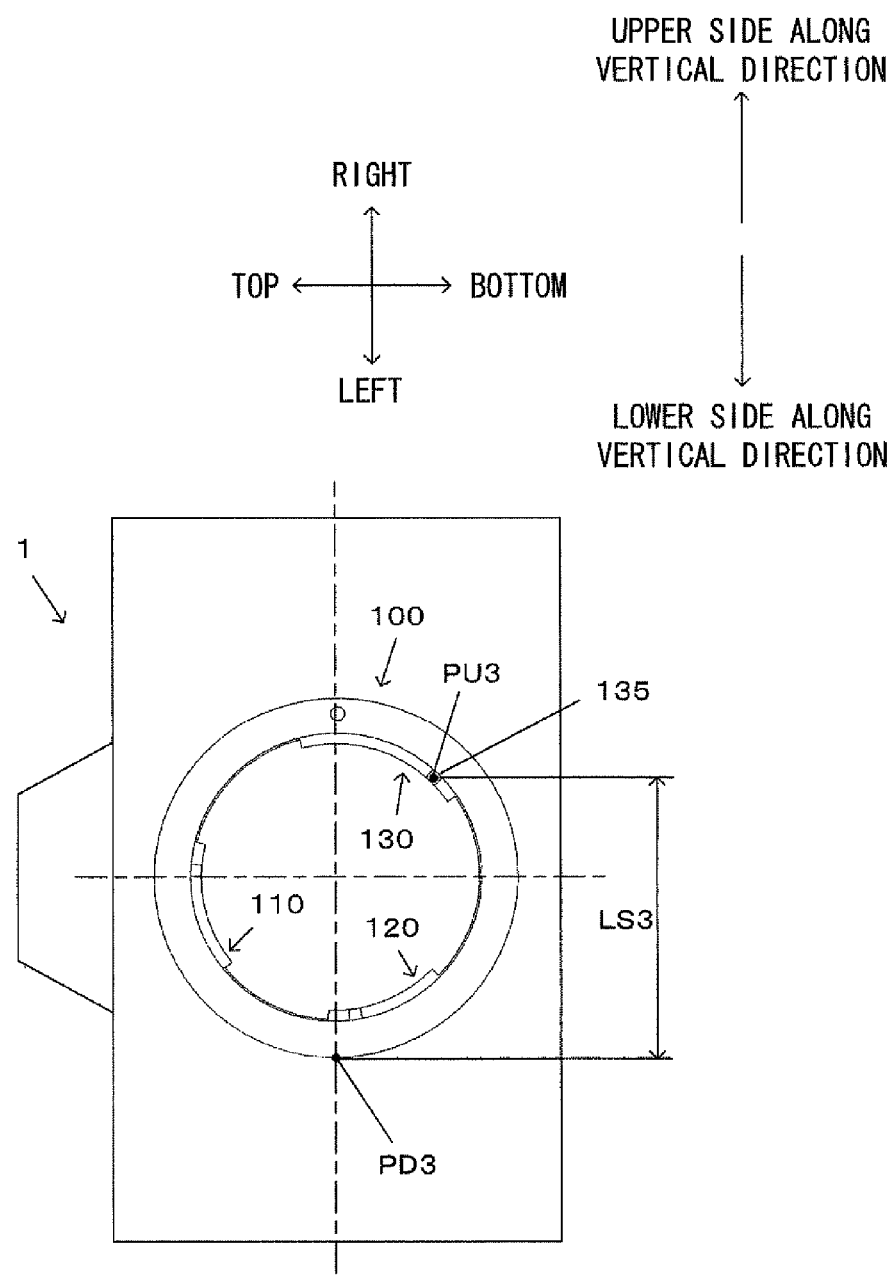
FIG. 19 indicates the contact points PD and PU and the distance LS assumed when the camera body is in another longitudinal orientation.

FIGS. 17 through 19 each indicate the contact points PD and PU and the distance LS corresponding to a specific attitude assumed by the camera body 1. It is to be noted that the camera body 1 assumes the upright attitude (lateral orientation) in FIG. 17, with the distance LS and the contact points PD and PU corresponding to this attitude respectively notated as LS1, PD1 and PU1. The camera body 1 assumes a longitudinal orientation in FIG. 18 achieved by turning the left side of the camera body 1 upward, with the distance LS and the contact points PD and PU corresponding to this attitude respectively notated as LS2, PD2 and PU2. The camera body 1 assumes a longitudinal orientation in FIG. 19 achieved by turning the right side of the camera body 1 upward, with the distance LS and the contact points PD and PU corresponding to the particular attitude respectively notated as LS3, PD3 and PU3. The distance LS1 assumed in the lateral orientation in FIG. 17 and the distance LS2 assumed in the longitudinal orientation in FIG. 18 are both substantially equal to the diameter of the camera body mount 100. However, the distance LS3 in the longitudinal orientation shown in FIG. 19 is markedly smaller than the distances LS1 and LS2.

For this reason, at a given level of external force applied to the photographic lens 2, the level of force working at PU3 will be greater than the levels of force working at PU1 and PU2.

Accordingly, the body-side third tab 130 in the embodiment is formed so as to assume a greater length along the circumferential direction compared to the body-side first tab 110 and the body-side second tab 120. Greater strength is thus assured for the body-side third tab 130 over the body-side first tab 110 and the body-side second tab 120. In addition, the accessory-side third tab 230 at the camera accessory mount 200, which is to come into contact with the contact portion 135 (i.e., PU3) when the photographic lens 2 is fully mounted, is formed to achieve a greater length along the circumferential direction than the accessory-side first tab 210 and the accessory-side second tab 220. Consequently, since ample strength is assured at the body-side third tab 130 and the accessory-side third tab 230, the body-side third tab 130 and the accessory-side third tab 230, which are to be subjected to the highest levels of force, will remain intact even when the camera body 1 assumes the longitudinal orientation shown in FIG. 19.

As described above, the advantage of reliably disallowing erroneous insertion at any phase other than the correct interlock phase and the advantage of assuring sufficient strength for the camera accessory mount 200 and the camera body mount 100 when the photographic lens 2 having been inserted at the correct interlock phase is fully mounted can both be achieved through the embodiment described above.

(9) As explained earlier, different functions are achieved in the area near the first side end 111 and in the area near the second side end 112, i.e., in the areas located on the sides opposite each other along the direction in which the body-side first tab 110 extends. The durability of the body-side first tab 110 is thus improved. The body-side first tab 110, where the spring 116, which, under the weight of the photographic lens 2, is subjected to a more significant and continuous load compared to the other springs 126 and 136 is present, and the application of force occurs at PU1 as described earlier when the camera body 1 assumes the typical lateral orientation, is subjected to a load most frequently. Since the durability of the body-side first tab 110 coming under the most frequent load is improved, the durability and the reliability of the camera body mount 100 itself are improved.

(10) The contact portion 115 is set substantially at the top center of the camera body mount 100 in the structure achieved in the embodiment and thus, a large value can be set for LS1 mentioned earlier. As a result, the level of force applied at the contact point PU1 can be reduced, which, in turn, improves the durability of the body-side first tab 110 and effectively prevents the photographic lens 2 from drooping down at its front side. At the same time, the body-side first tab 110 is set at the top center of the camera body mount 100 and, as a result, sufficient strength is assured for the contact portion 115, thereby improving the durability of the body-side first tab 110. This ultimately leads to improvements both in the durability and in the reliability of the camera body mount 100, itself.

(11) As indicated in FIG. 16, the lower areas of the rear surfaces of the body-side tabs 110 to 130 and the lower areas of the front surfaces of the accessory-side tabs 210 to 230 come into contact with each other least readily. This means that there is not a significant need for having the body-side tabs 110 to 130 and the accessory-side tabs 210 to 230 come into contact with each other over these areas. Accordingly, the largest body-side gap, i.e., the body-side third gap 153 in the embodiment is positioned on the lower side of the camera body mount 100, as illustrated in FIG. 5 in the embodiment. This, in turn, ensures that the body-side tabs 110 to 130 can be positioned in a highly rational configuration.

(12) The following is the rationale for disposing the accessory-side tabs 210 to 230 at the specific positions indicated in FIG. 6. Namely, it is desirable to assure a high degree of strength with a greater length assumed along the circumferential direction at the accessory-side first tab 210, which is positioned at the top center when the photographic lens 2 is mounted at the camera body 1 assuming the lateral orientation. However, since the body-side third gap 153, i.e., the largest body-side gap, is set on the lower side of the camera body mount 100, as described earlier, the accessory-side third tab 230, which passes through the body-side third gap 153 when the camera accessory mount is inserted at the correct interlock phase, is formed to range over the greatest length along the circumferential direction. Accordingly, the accessory-side first tab 210 is formed to range over a second largest length along the circumferential direction. The accessory-side second tab 220, which is not subjected to as many restrictions, is formed so as to extend over a smallest range along the circumferential direction. The accessory-side tabs 210 to 230 formed as described above can be disposed with a high level of rationality.

—Variations—

(1) While the accessory-side tabs 210 to 230 are fixed onto the main body of the photographic lens 2 and the photographic lens 2 is mounted or dismounted by turning it along the mounting direction or the dismounting direction relative to the camera body 1 in the embodiment described above, the present invention is not limited to this example. For instance, the present invention may be adopted in conjunction with a structure that includes accessory-side tabs 210 to 230 rotatably disposed relative to the main body of the photographic lens 2 and allows the photographic lens 2 to be mounted at the camera body 1 simply by rotating the accessory-side tabs 210 to 230 alone along the mounting direction once the photographic lens 2 is positioned at the correct interlock phase.

Figure 23A:
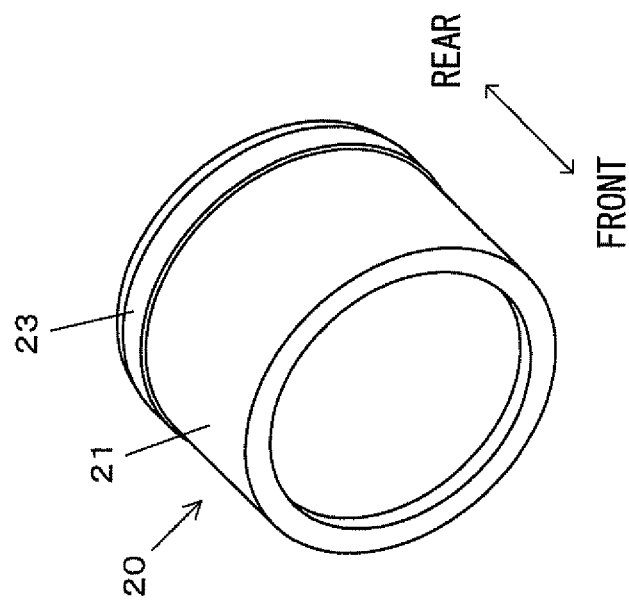
FIGS. 23A and 23B illustrate an example of a variation.
Figure 23B:
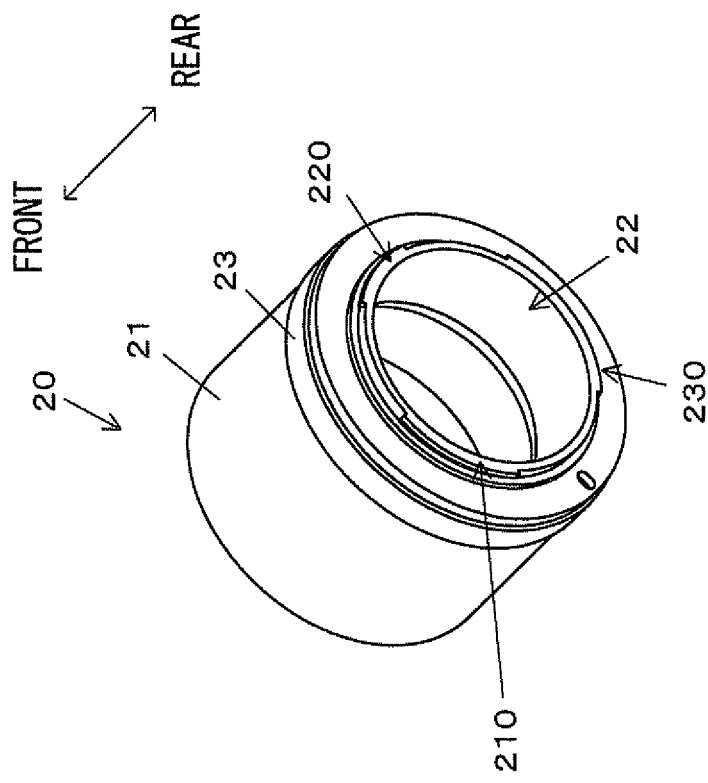

FIGS. 23A and 23B present external views of a photographic lens 20 with accessory-side tabs 210 to 230 formed thereat so that they are able to rotate relative to the main body of the photographic lens 2. A photographic lens 20 includes a lens barrel 21, a bayonet tube 22 disposed rotatably relative to the lens barrel 21 with accessory-side tabs 210 to 230 being disposed at the bayonet tube, and an operation ring 23 via which the bayonet tube 22 is rotated relative to the lens barrel 21. It is to be noted that in FIGS. 23A and 23B and other figures in reference to which the following description is provided, the same reference numerals are assigned to members similar to those already described so as to preclude the necessity for a repeated explanation thereof.

Figure 24:
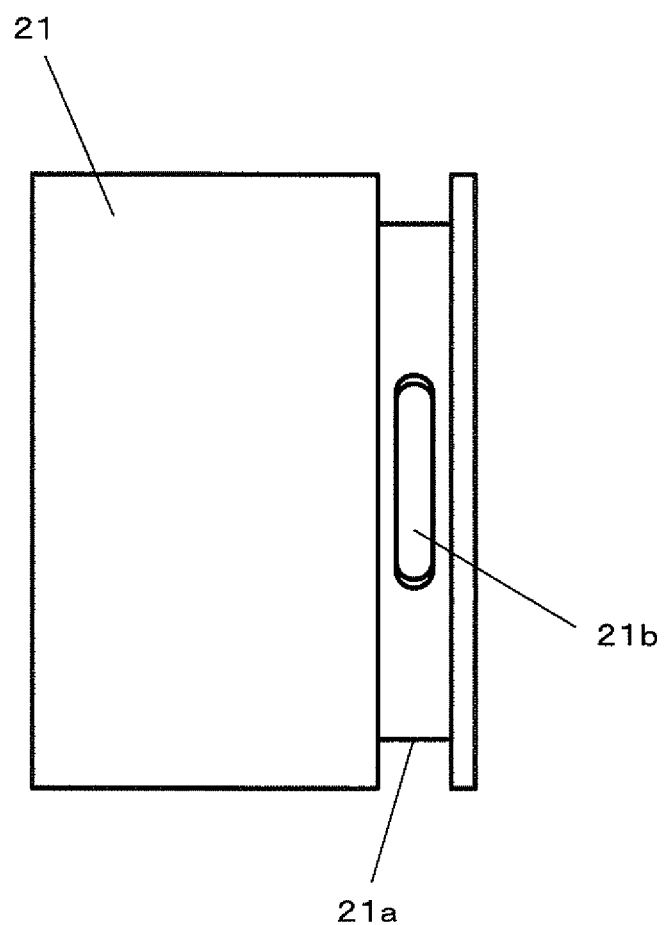
FIG. 24 provides an illustration of the variation.
Figure 25C:
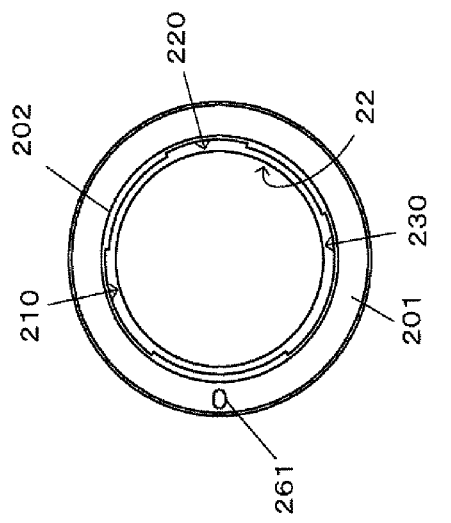
FIGS. 25A through 25D are illustrations pertaining to the variation.
Figure 25B:
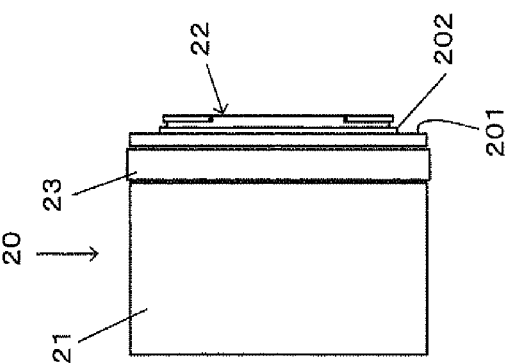
Figure 25A:
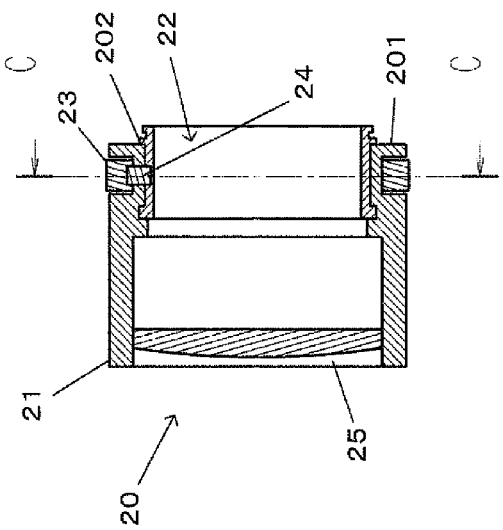
Figure 25D:
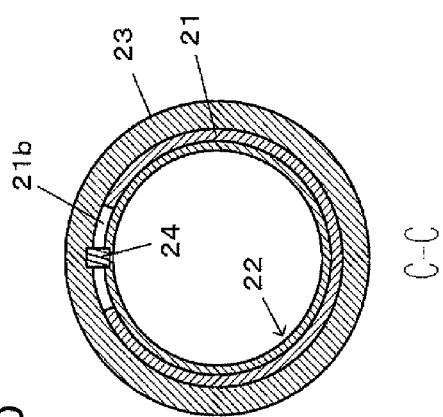

FIG. 24 presents an external view of the lens barrel 21, whereas FIGS. 25A to 25D schematically illustrate the structure of the photographic lens 20. As shown in FIG. 24, a fitting groove 21*a* at which the operation ring 23 fits is formed at the rear of the lens barrel 21. An elongated hole 21*b*, through which a pin 24 connecting the operation ring 23 with the bayonet tube 22 is allowed to move, is formed at the bottom of the fitting groove 21*a*. As indicated in the sectional views presented in FIGS. 25A and 25D, the operation ring 23 fits into the fitting groove 21*a* at the lens barrel 21 and the operation ring 23 and the bayonet tube 22 are linked with each other via the pin 24. Reference numeral 25 indicates a lens. As the operation ring 23 is rotated relative to the lens barrel 21 of the photographic lens 20 structured as described above, the bayonet tube 22, i.e., the accessory-side tabs 210 to 230, turns together with the operation ring 23 relative to the lens barrel 21. The photographic lens 20 assuming this structure can be mounted at the camera body 1 without having to turn the lens barrel 21, by simply operating the operation ring 23 to turn the bayonet tube 22 alone along the mounting direction once the photographic lens 20 is positioned at the correct interlock phase. It is to be noted that FIG. 25D is a sectional view taken along C-C in FIG. 25A.

(2) The photographic lenses 2 and 20 described above each represent an example of a camera accessory. The present invention is not limited to these examples and may be adopted in conjunction with any of various types of camera accessories such as a converter lens used to adjust the focal length or an adapter used to adjust the distance from the photographic lens mount surface to the image capturing plane, as long as it includes a camera accessory mount 200, which can be engaged with a camera body mount 100.

(3) While the restricting member 262 described above is a headed pin disposed at the camera accessory mount 200, an area near the second side end 222, for instance, may be formed in a specific shape so as to function as a restricting member 262, instead of providing a separate member. Namely, an area near the second side end 222 may be formed to assume a shape that will allow the area to function as a restricting member 262 through injection molding at a camera accessory mount 200 constituted with a resin injection mold.

(4) The camera body mount 100 described above may be disposed at the photographic lens 2 and the camera accessory mount 200 described above may be disposed at the camera body 1.

(5) An explanation has been given above in reference to the embodiment on an example in which the present invention is adopted in a camera system comprising the camera body 1 and the exchangeable lens 2. However, the present invention is not limited to this example and may be adopted in any system other than a camera system, as long as it includes a mount at which the exchangeable lens 2 can be detachably mounted. Such a system may be, for instance, an electronic device such as a projector. A system similar to that described in reference to the embodiment can be achieved by equipping the projector with an exchangeable projection lens that can be detachably mounted.

(6) While the explanation given above includes a description that the springs 116, 126 and 136 may each be constituted with, for instance, a plate spring or leaf spring, the present invention may be adopted in conjunction with springs such as torsion coil springs or compression coil springs rather than plate springs. In addition, forces imparted along the rearward direction by elastic members such as rubber members, instead of springs, may be applied to the accessory-side tabs.

(7) While the present invention is adopted in conjunction with the springs 116, 126 and 136, provided as members independent of each other, as described above, a force imparted from a single spring may be applied to the individual accessory-side tabs along the rearward direction at spring force pressing positions 116*b*, 126*b* and 136*b*.

(8) While the explanation provided above does not include any special reference to a specific method that may be adopted when securing the springs 116, 126 and 136 at fixed positions, the springs 116, 126 and 136 may be fixed to the camera body mount 100, they may be fixed to the camera body 1 or they may be held tight between the camera body 1 and the camera body mount 100 at fixed positions.

(9) The embodiment and variations described above may be adopted in combination.

It is to be noted that the present invention is not limited to the specific structural features of the embodiment described above and that a camera accessory that can be detachably engaged with a camera body which includes a camera body mount and a plurality of body-side electric contact points, adopting any of various structures and equipped with a camera accessory mount assuming a bayonet structure with first through third tabs set over intervals along a circumferential direction in which the circumference of a circle with a predetermined diameter extends and projecting out from the circumference along a radial direction, characterized in that the camera accessory includes accessory-side electric contact points made up with a plurality of electric contact points that become electrically connected with the body-side electric contact points as the camera accessory is mounted at the camera body, that a camera accessory mount is allowed to be inserted through the camera body mount without any of the first through third tabs being hindered by any of three camera body-side tabs at the camera body mount, as long as the camera accessory mount is inserted at the camera body mount at a correct interlock phase, that insertion of the camera accessory mount through the camera body mount is disallowed at any phase other than the correct interlock phase as at least two tabs among the first through third tabs come into contact with at least two of the camera body-side tabs, that as the camera accessory is mounted at the camera body, the first through third tabs each come into contact with an elastic member disposed at the camera body so that a force imparted from the elastic member is applied to the first through third tabs toward a rear side of the camera body, that the first through third tabs each include a force application portion at which the force imparted from the elastic member is applied when the camera accessory is mounted at the camera body, and that two force application portions located at positions close to a position where the accessory-side electric contact points are disposed, among a first force application portion of the first tab, a second force application portion of the second tab and a third force application portion of the third tab, are set so as to substantially achieve symmetry relative to the accessory-side electric contact points, and a camera accessory mount adopting any of various structures, which may be included in the camera accessory, are all within the scope of the present invention.

In addition, the present invention is not limited in any way whatsoever by the specific features of the embodiment described above and a camera body that can be detachably engaged with a camera accessory equipped with a camera accessory mount and a plurality of accessory-side electric contact points adopting any of various structures and equipped with a camera body mount assuming a bayonet structure with first through third tabs set over intervals along a circumferential edge of a circular opening at the camera body and projecting out from the circumferential edge along a radius of the circular opening, characterized in that the camera body includes camera body-side electric contact points made up with a plurality of electric contact points that become electrically connected with the accessory-side electric contact points as the camera accessory is mounted at the camera body and an elastic member that applies a force to each of three accessory-side tabs located at the camera accessory mount included in the camera accessory toward a rear side of the camera body, that the elastic member includes three force-applying portions that come into contact with the three accessory-side tabs to apply force thereto, that two force-applying portions located at positions close to a position where the camera body-side electric contact points are disposed, among the three force-applying portions, are set so as to substantially achieve symmetry relative to the camera body-side contact points, that the camera body mount allows the camera accessory mount to be inserted thereat without any of the first through third tabs hindering any of the three accessory-side tabs at the camera accessory mount, as long as the camera accessory mount is inserted at a correct interlock phase, and that insertion of the camera accessory mount is disallowed at any phase other than the correct interlock phase as at least two tabs among the first through third camera body-side tabs and at least two of the accessory-side tabs come into contact with each other, and a camera body mount adopting any of various structures, which may be included in the camera body, are all within the scope of the present invention.

Through the embodiments of the present invention described above, the durability of the camera body mount and the camera accessory mount can be improved while preventing erroneous mounting of the camera accessory with a high degree of reliability.

The above described embodiments are examples, and various modifications can be made without departing from the scope of the invention.

What is claimed is:

1. A camera accessory that is detachably engaged with a camera body including a camera body mount and a plurality of body-side electric contact points, the camera accessory comprising:
   a camera accessory mount assuming a bayonet structure with a first tab, a second tab and a third tab set over intervals in a circumferential direction running along a circumference of a circle with a predetermined diameter and projecting from the circumference along a radial direction; and
   accessory-side electric contact points made up with a plurality of electric contact points that become electrically connected with the body-side electric contact points as the camera accessory is mounted at the camera body, wherein:
   the camera accessory mount is configured to be inserted through the camera body mount without any of the first through third tabs hindered by three camera body-side tabs disposed at the camera body mount as long as the camera accessory mount is inserted at the camera body mount at a correct interlock phase, and the camera accessory mount is configured such that insertion of the camera accessory mount through the camera body mount is disallowed at any phase other than the correct interlock phase with at least two tabs among the first through third tabs coming into contact with at least two of the camera body-side tabs;
   each of the first through third tabs includes a force application portion, each of the first through third tabs being configured to receive a force imparted from an elastic member at the force application portion toward a reverse side of the camera body when the camera accessory is mounted at the camera body, the elastic member being formed at the camera body-side tabs; and
   two force application portions located at positions close to a position where the accessory-side electric contact points are disposed, among a first force application portion of the first tab, a second force application portion of the second tab and a third force application portion of the third tab, are set so as to substantially achieve symmetry relative to the accessory-side electric contact points.

2. A camera accessory according to claim 1, wherein:
   the first tab at the camera accessory mount having been inserted at the correct interlock phase and engaged with the camera body mount overlaps a camera body-side tab assuming an uppermost position when the camera body is set with a longitudinal orientation achieved by rotating the camera body assuming an upright, lateral orientation by approximately 90°.

3. A camera accessory according to claim 1, wherein:
   the first tab, the second tab and the third tab are fixed to a main body of the camera accessory.

4. A camera accessory according to claim 1, wherein:
   the first tab, the second tab and the third tab are disposed at a main body of the camera accessory so as to be rotatable along the circumferential direction relative to the main body of the camera accessory.

5. A camera accessory according to claim 1, wherein:
   the first tab, the second tab and the third tab are made up with a tab present over an angular range of 56.5° to 115°, a tab present over an angular range of 172.5° to 214.5° and a tab present over an angular range of 272° to 343.5° at the camera accessory mount engaged with the camera body mount, along a clockwise direction relative to a nine o'clock direction viewed from a rear side of the camera accessory.

6. A camera accessory according to claim 1, wherein:
   angles defining circular arcs representing lengths of the first tab, the second tab and the third tab extending along the circumferential direction are respectively 71.5°, 58.5° and 42°.

7. A camera accessory according to claim 5, wherein:
   when the first tab, the second tab and the third tab are rotated along the circumferential direction by 40.5° while the camera accessory mount is inserted at the correct interlock phase into the camera body mount, the camera accessory mount becomes engaged with the camera body mount.

8. A camera accessory mount included in the camera accessory according to claim 1.

9. A camera body that is detachably engaged with a camera accessory including a camera accessory mount and a plurality of accessory-side electric contact points, the camera body comprising:

a camera body mount with a first tab, a second tab and a third tab set over intervals along a circumferential edge of a circular opening at the camera body and projecting out from the circumferential edge along a radius of the circular opening;

camera body-side electric contact points made up with a plurality of electric contact points that become electrically connected with the accessory-side electric contact points as the camera accessory is mounted at the camera body; and an elastic member that applies a force to each of three accessory-side tabs, located at the camera accessory mount included in the camera accessory, the elastic member being configured to force each of three accessory-side tabs toward a rear side of the camera body as the camera accessory is mounted at the camera body, wherein:

the elastic member includes three force-applying portions that come into contact with the three accessory-side tabs to apply force thereto;

two force-applying portions located at positions close to a position where the camera body-side electric contact points are disposed, among the three force-applying portions, are set so as to substantially achieve symmetry relative to the camera body-side contact points; and the camera body mount is configured such that the camera accessory mount is inserted into the camera body mount without any of the first through third tabs hindering any of the three accessory-side tabs at the camera accessory mount, as long as the camera accessory mount is inserted at a correct interlock phase, and the camera body mount is configured such that insertion of the camera accessory mount is disallowed at any phase other than the correct interlock phase as at least two tabs among the first through third tabs and at least two of the accessory-side tabs come into contact with each other.

10. A camera body according to claim 9, wherein:
the camera body-side electric contact points are disposed in a substantially left/right symmetrical formation over an area corresponding to a bottom half of the opening at the camera body set upright in a lateral orientation; and
the two force-applying portions located at positions close to the position at which the camera body-side electric contact points are disposed, among the three force-applying portions, are set so as to substantially achieve left/right symmetry with the camera body set upright in the lateral orientation.

11. A camera body according to claim 10, wherein:
the two force-applying portions located close to the position where the camera body-side electric contact points are disposed, among the three force-applying portions, are disposed near the camera body-side electric contact points present near two ends of a circular arc among the camera body-side electric contact points.

12. A camera body according to claim 9, wherein:
the first tab assumes an uppermost position when the camera body is set upright in a lateral orientation;
the first through third tabs each include a first side end located at a leading end along a rotating direction in which the accessory-side tabs are rotated along the circumferential edge of the circular opening in order to engage the camera accessory mount having been inserted at the correct interlock phase with the camera body mount, and a second side end located at leading end along a direction opposite from the rotating direction; and when the first tab and either the second tab or the third tab come into contact with two of the accessory-side tabs at a total of two contact locations, a contact area at the first tab includes an area near the first side end of the first tab.

13. A camera body according to claim 12, wherein:
the opening is formed at a front side of the camera body; and
the first tab extends along a circumference of the opening with a part thereof passing through a point at a top center of the opening at the camera body assuming the lateral orientation.

14. A camera body according to claim 13, wherein:
the first tab, the second tab and the third tab include restricting portions that restrict movement of the accessory-side tabs by coming into contact with the accessory-side tabs when the accessory-side tabs move toward a front side of the camera body against the force applied by the elastic member.

15. A camera body according to claim 14, wherein:
a restricting portion included in the first tab assumes a position directly above a center of the opening along a vertical direction when the camera body is set in the lateral orientation.

16. A camera body according to claim 9, wherein:
the first tab, the second tab and the third tab extend over different lengths along a circumference of the opening; and
of the intervals each present between two consecutive tabs among the first tab, the second tab and the third tab, an interval between two tabs, occupying positions on two sides of a point set at a bottom center of the opening when the camera body is set in the lateral orientation, is largest.

17. A camera body according to claim 9, wherein:
the first tab, the second tab and the third tab are made up with a tab present over an angular range of 76° to 130°, a tab present over an angular range of 177.5° to 226° and a tab present over an angular range of 304.5° to 15° or 375° along a counterclockwise direction relative to a three o'clock direction when the opening at the camera body assuming a lateral orientation is viewed from a front side.

18. A camera body according to claim 17, wherein:
when the accessory-side tabs are rotated along a circumference of the opening by 40.5° while the camera accessory mount is inserted at the correct interlock phase into the camera body mount, the camera accessory mount becomes engaged with the camera body mount.

19. A camera body according to claim 9, wherein:
angular ranges measured along the circumferential edge of the opening, which represent sizes of the first tab, the second tab and the third tab, are respectively 54°, 48.5° and 70.5°.

20. A camera body according to claim 9, wherein:
angular ranges measured along the circumferential edge of the opening, each representing a size of an interval between tabs disposed next to each other among the first through third tabs, are 47.5° for the interval between the first tab and the second tab, 78.5° for the interval between the second tab and the third tab, and 61° for the interval between the third tab and the first tab.

21. A camera body mount included in the camera body according to claim 9.

22. A camera system, comprising:
a camera body; and
a camera accessory that is detachably engaged with the camera body, wherein:

the camera body comprises:
  a camera body mount with a first camera body-side tab, a second camera body-side tab and a third camera body-side tab set over intervals along a circumferential edge of a circular opening at the camera body and projecting out from the circumferential edge along a radius of the circular opening;
  camera body-side electric contact points; and
  an elastic member; and
the camera accessory comprises:
  a camera accessory mount assuming a bayonet structure with a first accessory-side tab, a second accessory-side tab and a third accessory-side tab set over intervals in a circumferential direction running along a circumference of a circle with a predetermined diameter and projecting from the circumference along a radial direction; and
  accessory-side electric contact points, and wherein
in the camera body
  the camera body-side electric contract points are made up with a plurality of electric contact points that become electrically connected with the accessory-side electric contact points as the camera accessory is mounted at the camera body;
  the elastic member applies a force to each of the first to third accessory-side tabs toward a rear side of the camera body as the camera accessory is mounted at the camera body;
  the elastic member includes three force-applying portions that come into contact with the first to third accessory-side tabs to apply force thereto;
  two force-applying portions located at positions close to a position where the camera body-side electric contact points are disposed, among the three force-applying portions, are set so as to substantially achieve symmetry relative to the camera body-side contact points;
  the camera body mount is configured such that the camera accessory mount is inserted into the camera body mount without any of the first through third camera body-side tabs hindering any of the first to third accessory-side tabs at the camera accessory mount, as long as the camera accessory mount is inserted at a correct interlock phase, and the camera body mount is configured such that insertion of the camera accessory mount is disallowed at any phase other than the correct interlock phase as at least two tabs among the first through third camera body-side tabs and at least two of the first to third accessory-side tabs come into contact with each other; and
  the first camera body-side tab, the second camera body-side tab and the third camera body-side tab are made up with a tab present over an angular range of 76° to 130°, a tab present over an angular range of 177.5° to 226° and a tab present over an angular range of 304.5° to 15° or 375° along a counterclockwise direction relative to a three o'clock direction when the opening at the camera body assuming a lateral orientation is viewed from a front side, and wherein
in the camera accessory,
  the accessory-side electric contact points are made up with a plurality of electric contact points that become electrically connected with the body-side electric contact points as the camera accessory is mounted at the camera body;
  as the camera accessory is mounted at the camera body, the first through third accessory-side tabs each come into contact with the elastic member so that a force imparted from the elastic member is applied to the first through third accessory-side tabs toward a rear side of the camera body;
  the first through third accessory-side tabs each include a force application portion at which the force imparted from the elastic member is applied when the camera accessory is mounted at the camera body;
  two force application portions located at positions close to a position where the accessory-side electric contact points are disposed, among a first force application portion of the first accessory-side tab, a second force application portion of the second accessory-side tab and a third force application portion of the third accessory-side tab, are set so as to substantially achieve symmetry relative to the accessory-side electric contact points; and
  the first accessory-side tab, the second accessory-side tab and the third accessory-side tab are made up with a tab present over an angular range of 56.5° to 115°, a tab present over an angular range of 172.5° to 214.5° and a tab present over an angular range of 272° to 343.5° at the camera accessory mount engaged with the camera body mount, along a clockwise direction relative to a nine o'clock direction viewed from a rear side of the camera accessory.

23. A camera accessory that is detachably engaged with a camera body including a camera body mount and a plurality of body-side electric contact points, the camera accessory comprising:
  a camera accessory mount assuming a bayonet structure with a first tab, a second tab and a third tab set over intervals in a circumferential direction running along a circumference of a circle with a predetermined diameter and projecting from the circumference along a radial direction; and
  accessory-side electric contact points made up with a plurality of electric contact points that become electrically connected with the body-side electric contact points as the camera accessory is mounted at the camera body, the accessory-side electric contact points being not disposed at the first tab, the second tab and the third tab,
  wherein:
  the camera accessory mount is configured to be inserted through the camera body mount without any of the first through third tabs hindered by three camera body-side tabs disposed at the camera body mount as long as the camera accessory mount is inserted at the camera body mount at a correct interlock phase, and the camera accessory mount is configured such that insertion of the camera accessory mount through the camera body mount is disallowed at any phase other than the correct interlock phase with at least two tabs among the first through third tabs coming into contact with at least two of the camera body-side tabs;
  each of the first through third tabs includes a force application portion, each of the first through third tabs being configured to receive a force imparted from an elastic member at the force application portion toward a reverse side of the camera body when the camera accessory is mounted at the camera body, the elastic member being formed at the camera body-side tabs; and
  two force application portions located at positions close to a position where the accessory-side electric contact points are disposed, among a first force application portion of the first tab, a second force application portion of the second tab and a third force application portion of the third tab, are set so as to substantially achieve symmetry relative to the accessory-side electric contact points.

24. A camera body that is detachably engaged with a camera accessory including a camera accessory mount and a plurality of accessory-side electric contact points, the camera body comprising:

a camera body mount with a first tab, a second tab and a third tab set over intervals along a circumferential edge of a circular opening at the camera body and projecting out from the circumferential edge along a radius of the circular opening;

camera body-side electric contact points made up with a plurality of electric contact points that become electrically connected with the accessory-side electric contact points as the camera accessory is mounted at the camera body, the camera body-side electric contact points being disposed at a first area having a first central angle, at least a part of the first central angle not overlapping with a second central angle which is defined by a second area where each of the first tab, the second tab and the third tab is disposed; and an elastic member that applies a force to each of three accessory-side tabs, located at the camera accessory mount included in the camera accessory, the elastic member being configured to force each of three accessory-side tabs toward a rear side of the camera body as the camera accessory is mounted at the camera body, wherein:

the elastic member includes three force-applying portions that come into contact with the three accessory-side tabs to apply force thereto;

two force-applying portions located at positions close to a position where the camera body-side electric contact points are disposed, among the three force-applying portions, are set so as to substantially achieve symmetry relative to the camera body-side contact points; and the camera body mount is configured such that the camera accessory mount is inserted into the camera body mount without any of the first through third tabs hindering any of the three accessory-side tabs at the camera accessory mount, as long as the camera accessory mount is inserted at a correct interlock phase, and the camera body mount is configured such that insertion of the camera accessory mount is disallowed at any phase other than the correct interlock phase as at least two tabs among the first through third tabs and at least two of the accessory-side tabs come into contact with each other.

* * * * *